(12) United States Patent
Teyeb et al.

(10) Patent No.: US 12,507,084 B2
(45) Date of Patent: Dec. 23, 2025

(54) UE TRIGGERED SECOND CELL GROUP SUSPENSION/DORMANCY/DEACTIVATION/RESUMPTION

(71) Applicant: Telefonaktiebolaget LM Ericsson (publ), Stockholm (SE)

(72) Inventors: Oumer Teyeb, Montréal (CA); Icaro Leonardo Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 18/018,919

(22) PCT Filed: Jul. 31, 2021

(86) PCT No.: PCT/IB2021/057011
§ 371 (c)(1),
(2) Date: Jan. 31, 2023

(87) PCT Pub. No.: WO2022/024092
PCT Pub. Date: Feb. 3, 2022

(65) Prior Publication Data
US 2023/0308905 A1    Sep. 28, 2023

Related U.S. Application Data

(60) Provisional application No. 63/059,512, filed on Jul. 31, 2020.

(51) Int. Cl.
*H04W 24/02* (2009.01)
*H04W 52/02* (2009.01)

(52) U.S. Cl.
CPC ....... *H04W 24/02* (2013.01); *H04W 52/0206* (2013.01)

(58) Field of Classification Search
CPC ................ H04W 24/02; H04W 52/0206
See application file for complete search history.

(56) References Cited

U.S. PATENT DOCUMENTS

2020/0112919 A1* 4/2020 Nam ................ H04L 5/001

FOREIGN PATENT DOCUMENTS

WO    2020151735 A1    7/2020

OTHER PUBLICATIONS

International Search Report and Written Opinion of the International Searching Authority for PCT International Application No. PCT/IB2021/057011 dated Dec. 2, 2021.
(Continued)

*Primary Examiner* — Gbemileke J Onamuti
(74) *Attorney, Agent, or Firm* — Sage Patent Group

(57) ABSTRACT

A method performed by a wireless terminal operating in Multi-Radio Dual Connectivity (MR-DC) and configured with a first cell group associated with a first network node and a second cell group associated with a second network node and a wireless terminal is provided. The method includes monitoring conditions and events for indicating that an operating mode of the second cell group should be modified. The method includes transmitting an indication to a network requesting a modification for the operating mode of the second cell group responsive to the monitoring indicating the operating mode of the second cell group should be modified. The method includes receiving a command from the network to change the operating mode of the second cell group. The method includes responsive to receiving the command, applying the command and start operating the second cell group in the indicated operating mode.

20 Claims, 22 Drawing Sheets

(56) References Cited

OTHER PUBLICATIONS

Vivo, "UE assistance information for power saving," R2-2000369, 3GPP TSG-RAN WG2 Meeting #109 electronic E-Meeting, Feb. 24-Mar. 6, 2020, 3 pages.
Apple, "UE Assistance Information for EN-DC," R2-1912467, 3GPP TSG-RAN WG2 Meeting #107bis, Chongqing, China, Oct. 14-18, 2019, 2 pages.
Ericsson, "SCG deactivation procedures," R2-2103807, 3GPP TSG-RAN WG2 #113bis-e, Electronic Meeting, Apr. 12-20, 2021, 10 pages.
Ericsson, "SCG deactivation procedures," R2-2103809, 3GPP TSG-RAN WG2 #113bis-e, Electronic Meeting, Apr. 12-20, 2021, 9 pages.

* cited by examiner

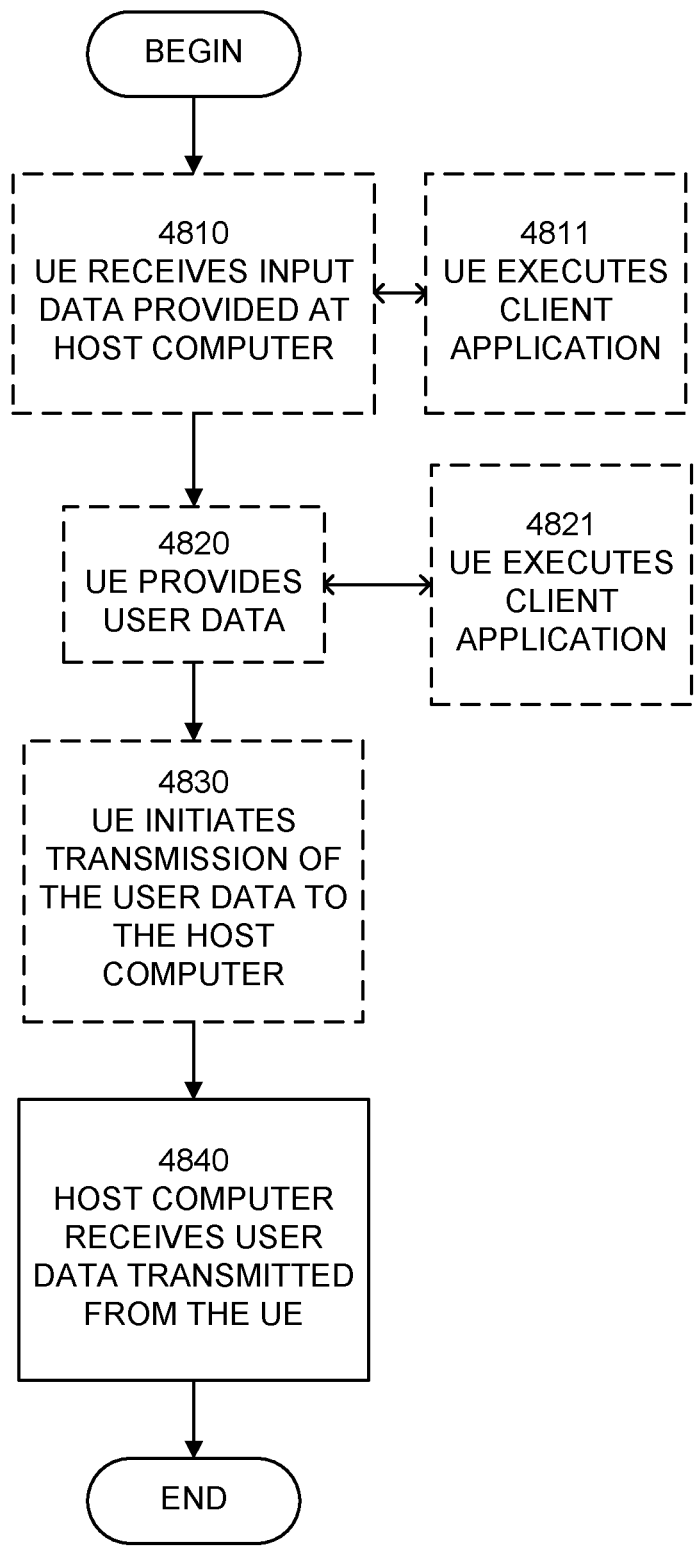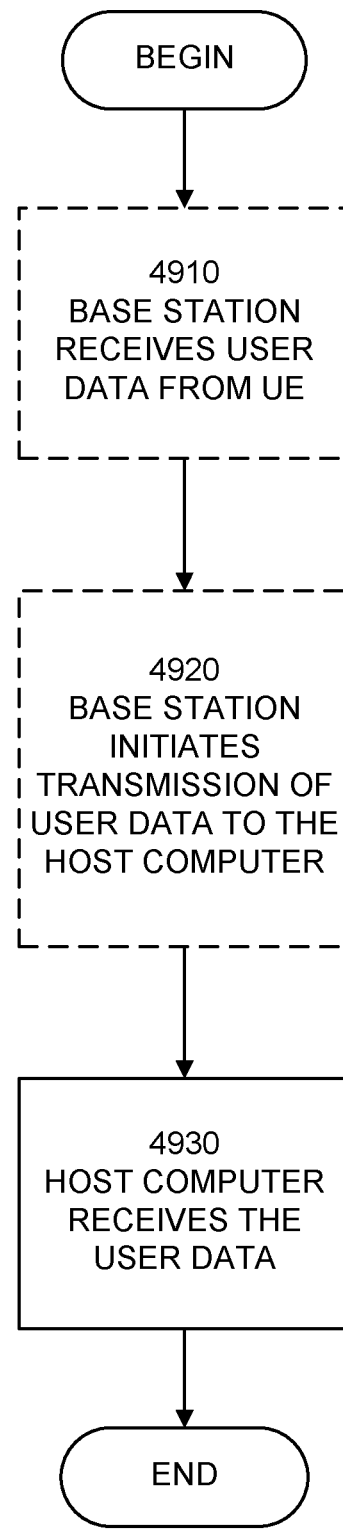
Figure 28
Figure 29

UE TRIGGERED SECOND CELL GROUP SUSPENSION/DORMANCY/DEACTIVATION/ RESUMPTION

CROSS REFERENCE TO RELATED APPLICATIONS

This application is a 35 U.S.C. § 371 national stage application of PCT International Application No. PCT/IB2021/057011 filed on Jul. 31, 2021, which claims the benefit of U.S. Provisional Patent Application Ser. No. 63/059,512, filed on Jul. 31, 2020, the disclosures and content of which are incorporated by reference herein in their entireties.

TECHNICAL FIELD

The present disclosure relates generally to communications, and more particularly to communication methods and related devices and nodes supporting wireless communications.

BACKGROUND

Dual Connectivity

Dual connectivity is generally used in new radio (NR) (e.g., 5G) and long term evolution (LTE) systems to improve user equipment (UE) transmit and receive data rate. With dual connectivity (DC), the UE initially operates in a serving cell group called a master cell group (MCG). The UE is then configured by the network with an additional cell group called a secondary cell group (SCG). Each cell group (CG) can have one or more serving cells. A MCG and a SCG can be operated from geographically non-collocated gNBs. The MCG and the SCG can be operated with corresponding serving cells belonging to different frequency ranges and/or corresponding serving cells in the same and different frequency ranges. In an example, a MCG can have serving cells in FR1, and the SCG can also have serving cells in FR1.

3GPP Architecture Options

There are different ways to deploy a 5G network with or without interworking with LTE (also referred to as Evolved Universal Terrestrial Radio Access (E-UTRA)) and evolved packet core (EPC), as depicted in FIG. 1. In principle, NR and LTE can be deployed without any interworking, denoted by NR stand-alone (SA) operation, that is gNB in NR can be connected to the 5G core network (5GC) and eNB can be connected to EPC with no interconnection between the two (Option 1 and Option 2 in FIG. 1). On the other hand, the first supported version of NR is the so-called EN-DC (Evolved Universal Terrestrial Radio Access Network (E-UTRAN)-NR Dual Connectivity), illustrated by Option 3 in FIG. 1. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As previously mentioned, option 2 supports standalone NR deployment where the gNB is connected to the 5GC. Similarly, LTE can also be connected to the 5GC using option 5 in FIG. 1 (which is also known as eLTE, E-UTRA/ 5GC, or LTE/5GC). In these cases, both NR and LTE are seen as part of the NG-RAN. It is worth noting that, Option 4/4A and option 7/7A illustrated in FIG. 1 are other variants of dual connectivity between LTE and NR which will be standardized as part of NG-RAN connected to 5GC, denoted by MR-DC (Multi-Radio Dual Connectivity). Option 6 and 8, where the gNB is connected to the EPC (with and without interconnectivity to LTE) are also possible, but seem to be less practical and are not being pursued further in 3GPP.

Under the MR-DC umbrella, we have:
EN-DC (Option 3): LTE is the master node and NR is the secondary (EPC CN employed)
NE-DC (Option 4): NR is the master node and LTE is the secondary (5GCN employed)
NGEN-DC (Option 7): LTE is the master node and NR is the secondary (5GCN employed)
NR-DC (variant of Option 2): Dual connectivity where both the master and secondary are NR (5GCN employed)

As migration for these options may differ from different operators, it is possible to have deployments with multiple options in parallel in the same network e.g. there could be an eNB base station supporting option 3, 5 and 7 in the same network and a NR base station supporting 2 and 4. In combination with dual connectivity solutions between LTE and NR, it is also possible to support CA (Carrier Aggregation) in each cell group (i.e. master cell group (MCG) and secondary cell group (SCG)) and dual connectivity between nodes on the same RAT (e.g. NR-NR DC). For the LTE cells, a consequence of these different deployments is the co-existence of LTE cells associated to eNBs connected to EPC, 5GC or both EPC/5GC.

MR-DC User Plane Architecture

From a UE point of view, there are three Data Radio Bearer (DRB) types in MR-DC. The three types are MCG, SCG and split DRB, which is characterized by which cell group that is used for transmission, as illustrated in FIG. 2. MCG DRB uses only the MCG, SCG DRB uses only the SCG, whereas split DRB can use both MCG and SCG for data transmission. For RLC/MAC, the protocol version (E-UTRA or NR) is selected based on the RAT used by the cell group. NR PDCP is used for all DRB types, except in EN-DC it is also possible for network to configure E-UTRA PDCP for MCG DRB.

From a network point of view, each DRB may be terminated either by the MN or the SN. This applies to all three bearer types, so that from a network point of view, six different bearer configurations are possible. This is illustrated in FIG. 3 and FIG. 4. For bearer types requiring data transmission over X2/Xn interface, a flow control protocol is used between MN and SN to avoid excessive buffering of data on RLC bearer level, which may lead to excessive reordering at the receiving PDCP entity. The RLC bearer contains the RLC/MAC configuration for each logical channel towards the UE.

MR-DC Control Plane Architecture

A UE in MR-DC has a single control plane connection to the core network and a single RRC state, controlled by the MN. Both MN and SN have their an own RRC entity for creating RRC messages or Information Elements (IE) for configuring the UE, as illustrated in FIG. 5. Since the SN is responsible for its own resources, it provides the UE with the Secondary Cell Group (SCG) configuration in an RRC message and also the radio bearer configuration in an IE, for all bearers that are terminated in the SN. The MN in turn creates the Master Cell Group (MCG) configuration and the radio bearer configuration for all bearers terminated in the MN. The cell group configuration includes the configuration of L1 (physical layer), MAC and RLC. The radio bearer configuration includes the configuration of PDCP (and SDAP in case of 5GC).

The MN sends the initial SN RRC configuration via MCG SRB (SRB1), but subsequent RRC configurations created by the SN can be sent to the UE either via the MN using SRB1 or directly to the UE using SRB3 (if configured). FIG. 6 illustrates different SRB types that can be used. For the SRB1 case, the MN receives from the SN an RRC message containing the SCG configuration and an IE containing the radio bearer configuration. The MN encapsulates these into the RRC message it creates itself, that may also include changes to the MCG configuration and radio bearer configuration of bearers terminated in the MN. Thereby, the MCG and SCG configurations may be sent to the UE in the same RRC message.

Split SRB1 is used to create diversity. From the RRC point of view, the split SRB operates like normal SRB1. However, on the PDCP level, the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg", "path" and "RLC bearer" are used interchangeably throughout this document.

For the SRB3 case, the SN creates the RRC message including the SCG configuration and radio bearer configuration for radio bearers terminated in the SN. SN may only use SRB3 for reconfigurations not requiring coordination with MN.

Bandwidth Parts

LTE carriers can be only up to 20 MHz wide (and a UE can be configured to utilize up to 640 MHz by utilizing 32 such carriers together with carrier aggregation). In NR, on the other hand, the maximum carrier bandwidth is 100 MHz in frequency range 1 (FR1: 450 MHz to 6 GHz), and 400 MHz in frequency range 2 (FR2: 24.25 GHz to 52.6 GHz). With carrier aggregation, a UE can be configured to use up to 800 MHz.

Configuring the UE with a wider bandwidth enables higher data rates, but it has the downside on UE power consumption. Just continuously scanning a full FR2 carrier of 400 MHz is very expensive. Thus, the concept of bandwidth parts (BWPs) was introduced in NR rel-15. BWPs allow the flexibility of subdividing a carrier into multiple parts, where each part is configured differently. For example, one BWP may have reduced energy requirements, while another may support different functions or services, and yet another may provide coexistence with other systems. Thus, for a certain carrier, the UE may be configured with multiple BWPs, where only one of them is active at a time, where switching from one BWP to another is triggered depending on the need (e.g. a narrower BWP for power saving, a wider BW to get more throughput when a higher data rate bearer is activated, a BWP employing smaller slot numerology for services that require very low latency, etc.). BWPs do not necessarily have to be contiguous, and one BWP could actually be completely within another BWP. FIG. 7 illustrates various examples of BWPs.

For each serving cell of the UE (regardless of the serving cell being a PCell/PSCell or an SCell that belongs to the MCG or SCG), up to 4 UL/DL BWPs can be configured. One DL BWP serves as the default DL BPW. Only one UL and one DL BWP are active at one time, meaning the UE cannot transmit PUSCH/PUCCH in the UL outside the UL BWP and cannot receive PDSCH/PDCCH outside the active DL BWP.

The switching between BWPs is performed via RRC signaling or even faster via DCI signaling at the physical layer. Implicit switching is also supported via a BWP inactivity timer (i.e. when the configured timer expires without any UP or CP activity from/to the UE on the concerned carrier, the UE switches to using the default BWP).

As can be seen in FIG. 8, each BWP has its own specific configuration including numerology, frequency location, bandwidth size and control resource set (CORSET). The CORSET provides the required information for the UE to monitor the PDCCH. Each CORESET is allocated with time and frequency resources with a periodicity of a slot.

Secondary Cell Activation and Deactivation

Though carrier aggregation enables the usage of wider bandwidths, thereby leading to higher aggregate throughput for the UE, it comes at the expense of UE power consumption. Even if the UE is not being scheduled on a certain carrier, maintaining that carrier (e.g. scanning the PDCCH for incoming scheduling, etc) consumes power. Thus, SCells can be set to be in deactivated state when they are not being utilized.

When an SCell is deactivated, the UE does not need to receive the corresponding PDCCH or PDSCH, cannot transmit in the corresponding uplink, nor is it required to perform CQI/CSI measurements. Conversely, when an SCell is active, the UE shall receive PDSCH and PDCCH (if the UE is configured to monitor PDCCH from this SCell), and is expected to be able to perform CQI measurements. To enable faster CQI reporting, a temporary CQI reporting period (called short CQI period) can be supported during SCell activation period. The activation/deactivation can be performed via RRC signaling (during SCell addition/Handover/Connection Resume), or a MAC CE. Implicit transition from activated to deactivate state is also possible via a configuration of inactivity timers.

Note that in this application, the terms Channel State Information (CSI) and Channel Quality Indication (CQI) are used interchangeably. However, strictly speaking, CSI is a collective name of several different type of UE reports that includes the CQI, precoding matrix indicator (PMI), precoding type indicator (PTI) and rank indication (RI).

FIG. 9 illustrates the transition between activated and inactivated state, and the timing requirements.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC.

Dormant SCells (LTE) and Dormancy Like Behavior of SCells (NR)

In LTE, to enable faster transition to activated state, a dormant state for SCells (i.e. not PCell or PSCell) is supported. When an SCell is in dormant state, like in the deactivate state, the UE does not need to monitor the corresponding PDCCH or PDSCH and cannot transmit in the corresponding uplink. However, differently from deactivated state, the UE is required to perform and report CQI measurements. A PUCCH SCell (SCell configured with PUCCH) cannot be in dormant state.

FIG. 10 illustrates dormant state SCells in LTE where the lower part shows the transition between activated and dormant states. The upper boxes labeled 1-6 correspond to the notes labeled 1-6 in FIG. 9.

FIG. 11 illustrates dormancy like behavior for SCells in NR. The dormancy like behavior for SCells in NR is realized using the concept of dormant BWPs. One dormant BWP, which is one of the dedicated BWPs configured by the network via RRC signaling, can be configured for an SCell. If the active BWP of the activated SCell is a dormant BWP, the UE stops monitoring PDCCH on the SCell but continues performing CSI measurements, AGC and beam management, if configured. A DCI is used to control entering/leaving the dormant BWP for one or more SCell(s) or one or more SCell group(s), and it is sent to the special cell (sPCell) of the cell group that the SCell belongs to (i.e. PCell in case the SCell belongs to the MCG and PSCell if the SCell belongs to the SCG). The SpCell (i.e. PCell of PSCell) and PUCCH SCell cannot be configured with a dormant BWP.

UE Assistance Information

The UE Assistance Information procedure is used by the UE to inform the network of:
- its delay budget report carrying desired increment/decrement in the connected mode DRX cycle length, or;
- its overheating assistance information, or;
- its IDC assistance information, or;
- its preference on DRX parameters for power saving, or;
- its preference on the maximum aggregated bandwidth for power saving, or;
- its preference on the maximum number of secondary component carriers for power saving, or;
- its preference on the maximum number of MIMO layers for power saving, or;
- its preference on the minimum scheduling offset for cross-slot scheduling for power saving, or;
- assistance information to transition out of RRC_CONNECTED state when the UE does not expect to send or receive data in the near future, or;
- configured grant assistance for NR sidelink communication A UE capable of providing delay budget report in RRC_CONNECTED may initiate the procedure in several cases, including upon being configured to provide delay budget report and upon change of delay budget preference.

A UE capable of providing overheating assistance information in RRC_CONNECTED may initiate the procedure if it was configured to do so, upon detecting internal overheating, or upon detecting that it is no longer experiencing an overheating condition.

A UE capable of providing IDC assistance information in RRC_CONNECTED may initiate the procedure if it was configured to do so, upon detecting IDC problem if the UE did not transmit an IDC assistance information since it was configured to provide IDC indications, or upon change of IDC problem information.

A UE capable of providing its preference on DRX parameters for power saving in RRC_CONNECTED may initiate the procedure in several cases, including upon being configured to provide its preference on DRX parameters and upon change of its preference on DRX parameters.

A UE capable of providing its preference on the maximum aggregated bandwidth for power saving in RRC_CONNECTED may initiate the procedure in several cases, including upon being configured to provide its maximum aggregated bandwidth preference and upon change of its maximum aggregated bandwidth preference.

A UE capable of providing its preference on the maximum number of secondary component carriers for power saving in RRC_CONNECTED may initiate the procedure in several cases, including upon being configured to provide its maximum number of secondary component carriers preference and upon change of its maximum number of secondary component carriers preference.

A UE capable of providing its preference on the maximum number of MIMO layers for power saving in RRC_CONNECTED may initiate the procedure in several cases, including upon being configured to provide its maximum number of MIMO layers preference and upon change of its maximum number of MIMO layers preference.

A UE capable of providing its preference on the minimum scheduling offset for cross-slot scheduling for power saving in RRC_CONNECTED may initiate the procedure in several cases, including upon being configured to provide its minimum scheduling offset preference and upon change of its minimum scheduling offset preference.

A UE capable of providing assistance information to transition out of RRC_CONNECTED state may initiate the procedure if it was configured to do so, upon determining that it prefers to leave RRC_CONNECTED state, or upon change of its preferred RRC state.

A UE capable of providing configured grant assistance information for NR sidelink communication in RRC_CONNECTED may initiate the procedure in several cases, including upon being configured to provide traffic pattern information and upon change of traffic pattern.

Bearer Configuration and Related PDCP/MAC Aspects

The UE obtains the bearer configuration in the radioBearerConfig that can be included in the RRCReconfiguration message. If a UE is configured with MR-DC, the radioBearerConfig will have two radio bearer configurations, one associated with the MCG (i.e. for MN terminated bearers) and one associated with the SCG (i.e. for SN terminated bearers). Each bearer has an associated PDCP configuration, and for split bearers, there is a configuration in the PDCP-Config (moreThanOneRLC) that specifies the primary path to be used for UL data transmission (i.e. either the MCG or the SCG). There is also a threshold ul-DataSplitThreshold specified under the moreThanOneRLC IE. If the UL buffer at the UE corresponding to that split bearer is below this threshold, the UE will only do the BSR reporting and/or UL scheduling request to the node hosting the primaryPath (e.g. if primaryPath is MCG, to MN, i.e. scheduling request/BSR sent via MCG MAC to the MN). If the UL buffer becomes above the threshold, the UE can send the BSR/Scheduling request to both the MN and SN (and send the UL data on whichever link, MCG or SCG, that gives the UE a grant).

PDCP Transmit Operation from 3GPP 38.323-f60

At reception of a PDCP SDU from upper layers, the transmitting PDCP entity shall:
- start the discardTimer associated with this PDCP SDU (if configured).

For a PDCP SDU Received from Upper Layers, the Transmitting PDCP Entity Shall:
- associate the COUNT value corresponding to TX_NEXT to this PDCP SDU;
    - NOTE 1: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.

perform header compression of the PDCP SDU as specified in the clause 5.7.4;

perform integrity protection, and ciphering using the TX_NEXT as specified in the clause 5.9 and 5.8, respectively;

set the PDCP SN of the PDCP Data PDU to TX_NEXT modulo 2[pdcp-SN-SizeUL];

increment TX_NEXT by one;

submit the resulting PDCP Data PDU to lower layer as specified below.

When submitting a PDCP PDU to lower layer, the transmitting PDCP entity shall:

if the transmitting PDCP entity is associated with one RLC entity:

submit the PDCP PDU to the associated RLC entity;

else, if the transmitting PDCP entity is associated with two RLC entities:

if the PDCP duplication is activated:

if the PDCP PDU is a PDCP Data PDU:

duplicate the PDCP Data PDU and submit the PDCP Data PDU to both associated RLC entities;

else:

submit the PDCP Control PDU to the primary RLC entity;

else:

if the two associated RLC entities belong to the different Cell Groups; and if the total amount of PDCP data volume and RLC data volume pending for initial transmission (as specified in TS 38.322 [5]) in the two associated RLC entities is equal to or larger than ul-DataSplitThreshold:

submit the PDCP PDU to either the primary RLC entity or the secondary RLC entity;

else:

submit the PDCP PDU to the primary RLC entity.

NOTE 2: If the transmitting PDCP entity is associated with two RLC entities, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

Data Volume Calculation (from 3GPP 38.323-f60)

For the purpose of MAC buffer status reporting, the transmitting PDCP entity shall consider the following as PDCP data volume:

the PDCP SDUs for which no PDCP Data PDUs have been constructed;

the PDCP Data PDUs that have not been submitted to lower layers;

the PDCP Control PDUs;

for AM DRBs, the PDCP SDUs to be retransmitted according to clause 5.1.2;

for AM DRBs, the PDCP Data PDUs to be retransmitted according to clause 5.5.

If the transmitting PDCP entity is associated with two RLC entities, when indicating the PDCP data volume to a MAC entity for BSR triggering and Buffer Size calculation (as specified in TS 38.321 [4] and TS 36.321 [12]), the transmitting PDCP entity shall:

if the PDCP duplication is activated:

indicate the PDCP data volume to the MAC entity associated with the primary RLC entity;

indicate the PDCP data volume excluding the PDCP Control PDU to the MAC entity associated with the secondary RLC entity;

else:

if the two associated RLC entities belong to the different Cell Groups; and if the total amount of PDCP data volume and RLC data volume pending for initial transmission (as specified in TS 38.322 [5]) in the two associated RLC entities is equal to or larger than ul-DataSplitThreshold:

indicate the PDCP data volume to both the MAC entity associated with the primary RLC entity and the MAC entity associated with the secondary RLC entity;

else:

indicate the PDCP data volume to the MAC entity associated with the primary RLC entity;

indicate the PDCP data volume as 0 to the MAC entity associated with the secondary RLC entity.

RadioBearerConfig

The IE RadioBearerConfig is used to add, modify and release signaling and/or data radio bearers. Specifically, this IE carries the parameters for PDCP and, if applicable, SDAP entities for the radio bearers.

| RadioBearerConfig information element |
| --- |
| -- ASN1START |
| -- TAG-RADIOBEARERCONFIG-START |
| RadioBearerConfig ::=              SEQUENCE { |
|     srb-ToAddModList                   SRB-ToAddModList          OPTIONAL, |
|     -- Cond HO-Conn |
|     srb3-ToRelease                     ENUMERATED{true}          OPTIONAL, |
|     -- Need N |
|     drb-ToAddModList                   DRB-ToAddModList          OPTIONAL, |
|     -- Cond HO-toNR |
|     drb-ToReleaseList                  DRB-ToReleaseList         OPTIONAL, -- |
| Need N |
|     securityConfig                     SecurityConfig            OPTIONAL, -- |
| Need M |
|     ... |
| } |
| SRB-ToAddModList ::=                   SEQUENCE (SIZE (1..2)) OF SRB-ToAddMod |
| SRB-ToAddMod ::=                       SEQUENCE { |
|     srb-Identity                   SRB-Identity, |
|     reestablishPDCP                    ENUMERATED{true}          OPTIONAL, |
|     -- Need N |
|     discardOnPDCP                      ENUMERATED{true} |

| RadioBearerConfig information element |
| --- |

```
OPTIONAL,   -- Need N
  pdcp-Config         PDCP-Config              OPTIONAL, --
Cond PDCP
    ...
}
DRB-ToAddModList ::=          SEQUENCE (SIZE (1..maxDRB)) OF DRB-ToAddMod
DRB-ToAddMod ::=              SEQUENCE {
  cnAssociation               CHOICE {
    eps-BearerIdentity            INTEGER (0..15),
    sdap-Config                   SDAP-Config
  }                                                OPTIONAL,   -- Cond DRBSetup
  drb-Identity        DRB-Identity,
  reestablishPDCP             ENUMERATED{true}           OPTIONAL,
-- Need N
  recoverPDCP         ENUMERATED{true}          OPTIONAL,
-- Need N
  pdcp-Config         PDCP-Config              OPTIONAL, --
Cond PDCP
  ...,
  [[
    dapsConfig-r16            ENUMERATED{true}           OPTIONAL
--Need N
  ]]
}
DRB-ToReleaseList ::=         SEQUENCE (SIZE (1..maxDRB)) OF DRB-Identity
SecurityConfig ::=        SEQUENCE {
  securityAlgorithmConfig         SecurityAlgorithmConfig
OPTIONAL,   -- Cond RBTermChange1
  keyToUse          ENUMERATED{master, secondary}
OPTIONAL,   -- Cond RBTermChange
    ...
}
-- TAG-RADIOBEARERCONFIG-STOP
-- ASN1STOP
-- TAG-RADIOBEARERCONFIG-STOP
-- ASN1STOP
```

PDCP-Config (from 38.331-g.0.0)

The IE PDCP-Config is used to set the configurable PDCP parameters for signalling and data radio bearers. Each radio bearer has an associated PDCP configuration.

| PDCP-Config information element |
| --- |

```
-- ASN1START
-- TAG-PDCP-CONFIG-START
PDCP-Config ::=           SEQUENCE {
  drb                 SEQUENCE {
    discardTimer              ENUMERATED {ms10, ms20, ms30, ms40, ms50, ms60, ms75,
ms100, ms150, ms200,
                                ms250, ms300, ms500, ms750, ms1500, infinity}      OPTIONAL, --
Cond Setup
    pdcp-SN-SizeUL            ENUMERATED {len12bits, len18bits}
OPTIONAL, -- Cond Setup2
    pdcp-SN-SizeDL            ENUMERATED {len12bits, len18bits}
OPTIONAL, -- Cond Setup2
    headerCompression             CHOICE {
      notUsed                 NULL,
      rohc                    SEQUENCE {
        maxCID                  INTEGER (1..16383)               DEFAULT 15,
        profiles                SEQUENCE {
          profile0x0001             BOOLEAN,
          profile0x0002             BOOLEAN,
          profile0x0003             BOOLEAN,
          profile0x0004             BOOLEAN,
          profile0x0006             BOOLEAN,
          profile0x0101             BOOLEAN,
          profile0x0102             BOOLEAN,
          profile0x0103             BOOLEAN,
          profile0x0104             BOOLEAN
        },
        drb-ContinueROHC    ENUMERATED { true }                  OPTIONAL
-- Need N
      },
```

-continued

| PDCP-Config information element |
|---|

```
        uplinkOnlyROHC              SEQUENCE {
            maxCID                      INTEGER (1..16383)              DEFAULT 15,
            profiles                    SEQUENCE {
                profile0x0006               BOOLEAN
            },
            drb-ContinueROHC            ENUMERATED { true }             OPTIONAL
-- Need N
        },
        ...
    }
        integrityProtection         ENUMERATED { enabled }              OPTIONAL,
-- Cond ConnectedTo5GC1
        statusReportRequired        ENUMERATED { true }                 OPTIONAL,
-- Cond Rlc-AM
        outOfOrderDelivery          ENUMERATED { true }                 OPTIONAL
-- Need R
    }                                                                   OPTIONAL,   -- Cond DRB
    moreThanOneRLC              SEQUENCE {
        primaryPath                 SEQUENCE {
            cellGroup                   CellGroupId                     OPTIONAL,   -- Need R
            logicalChannel              LogicalChannelIdentity          OPTIONAL --
Need R
        },
        ul-DataSplitThreshold       UL-DataSplitThreshold               OPTIONAL,
-- Cond SplitBearer
        pdcp-Duplication            BOOLEAN                             OPTIONAL --
Need R
    }                                                                   OPTIONAL,   -- Cond
More ThanOneRLC
    t-Reordering                ENUMERATED {
    ms0, ms1, ms2, ms4, ms5, ms8, ms10, ms15, ms20, ms30, ms40,
    ms50, ms60, ms80, ms100, ms120, ms140, ms160, ms180, ms200, ms220,
    ms240, ms260, ms280, ms300, ms500, ms750, ms1000, ms1250,
    ms1500, ms1750, ms2000, ms2250, ms2500, ms2750,
    ms3000, spare28, spare27, spare26, spare25, spare24,
    spare23, spare22, spare21, spare20,
    spare 19, spare18, spare17, spare16, spare15, spare14,
    spare 13, spare 12, spare11, spare10, spare09,
    spare08, spare07, spare06, spare05, spare04, spare03,
    spare02, spare01 }                                                  OPTIONAL, -- Need S
    ...,
    [[
    cipheringDisabled           ENUMERATED {true}                       OPTIONAL -
- Cond ConnectedTo5GC
    ]],
    [[
    discardTimerExt-r16         ENUMERATED {ms0dot5, ms1, ms2, ms4, ms6, ms8, spare3,
spare2, spare1 } OPTIONAL,   -- Cond DRB-Only
    more ThanTwoRLC-r16         SEQUENCE {
        splitSecondaryPath          LogicalChannelIdentity              OPTIONAL, --
Cond SplitBearer2
        duplicationState            SEQUENCE (SIZE (3)) OF BOOLEAN
OPTIONAL   -- Need M
    }                                                                   OPTIONAL,   -- Cond
MoreThanTwoRLC
    ethernetHeaderCompression-r16 CHOICE {
        notUsed                     NULL,
        ehc                         SEQUENCE {
            ehc-Common                  SEQUENCE {
                ehc-HeaderSize              ENUMERATED { byte1, byte2 },
                ...
            },
            ehc-Downlink                SEQUENCE {
                drb-ContinueEHC-DL          ENUMERATED { true }
OPTIONAL,   -- Need N
                ...
            }                                                           OPTIONAL,   -- Need N
            ehc-Uplink                  SEQUENCE {
                drb-ContinueEHC-UL          ENUMERATED { true }
OPTIONAL,   -- Need N
                ...
            }                                                           OPTIONAL,   -- Need N
        },
        ...
    }                                                                   OPTIONAL   -- Cond DRB
    ]]
```

| PDCP-Config information element |
|---|
| }<br>UL-DataSplitThreshold ::= ENUMERATED {<br>                                          b0, b100, b200, b400, b800, b1600, b3200, b6400, b12800, b25600,<br>b51200, b102400, b204800,<br>                                          b409600, b819200, b1228800, b1638400, b2457600, b3276800,<br>b4096000, b4915200, b5734400,<br>                                          b6553600, infinity, spare8, spare7, spare6, spare5, spare4, spare3,<br>spare2, spare1}<br>-- TAG-PDCP-CONFIG-STOP<br>-- ASN1STOP |

TAG-PDCP-CONFIG-STOP
ASN1STOP

| DCP-Config field descriptions |
|---|
| cipheringDisabled |
| If included, ciphering is disabled for this DRB regardless of which ciphering algorithm is configured for the SRB/DRBs. The field may only be included if the UE is connected to 5GC. Otherwise the field is absent. The network configures all DRBs with the same PDU-session ID with same value for this field. The value for this field cannot be changed after the DRB is set up.<br>discardTimer |
| Value in ms of discardTimer specified in TS 38.323 [5]. Value ms10 corresponds to 10 ms, value ms20 corresponds to 20 ms and so on. The value for this field cannot be changed in case of reconfiguration with sync, if dapsConfig is configured for this bearer.<br>discardTimerExt |
| Value in ms of discardTimer specified in TS 38.323 [5]. Value ms0dot5 corresponds to 0.5 ms, value ms1 corresponds to 1ms and so on.<br>If this field is present, the field discardTimer is ignored and discardTimerExt is used instead.<br>drb-ContinueEHC-DL, drb-ContinueEHC-UL |
| The fields indicate whether the PDCP entity continues or resets the EHC header compression protocol during PDCP re-establishment, as specified in TS 38.323 [5]. The field drb-ContinueEHC-DL indicates whether the PDCP entity continues or resets for downlink and the field drb-ContinueEHC-UL indicates whether the PDCP entity continues or resets for uplink. These fields are configured only in case of resuming an RRC connection or reconfiguration with sync, where the PDCP termination point is not changed and the fullConfig is not indicated.<br>drb-ContinueROHC |
| Indicates whether the PDCP entity continues or resets the ROHC header compression protocol during PDCP re-establishment, as specified in TS 38.323 [5]. This field is configured only in case of resuming an RRC connection or reconfiguration with sync, where the PDCP termination point is not changed and the fullConfig is not indicated.<br>duplicationState |
| This field indicates the initial uplink PDCP duplication state for the associated RLC entities. If set to true, the initial PDCP duplication state is activated for the associated RLC entity. The index for the indication is determined by ascending order of logical channel ID of all RLC entities other than the primary RLC entity indicated by primaryPath in the order of MCG and SCG, as in clause 6.1.3.Y of TS 38.321 [3]. If the number of associated RLC entities other than the primary RLC entity is two, UE ignores the value in the largest index of this field. The initial PDCP duplication state of the associated RLC entity is always activated for SRB.<br>ehc-HeaderSize |
| Indicates the size of the header for EHC packet.<br>Editor's note: The field is to capture the agreement "Both 1-byte header and 2-bytes header is supported and the choice depends on RRC configuration (of DRB). For one DRB the header size is fixed." This does not include the size of the Ethernet header, and the name will be updated. The name and the description will also be aligned with PDCP specification. FFS: The relation with the length of the CID field.<br>ethernetHeaderCompression |
| If ehc-Downlink is configured, then Ethernet header compression is configured for downlink. Otherwise, it is not configured for downlink.<br>If ehc-Uplink is configured, then Ethernet header compression is configured for uplink. Otherwise, it is not configured for uplink.<br>The fields in ehc-Common applies for both downlink and uplink once configured. Ethernet Header compression can only be configured for DRB. |

-continued

| DCP-Config field descriptions |
|---|
| headerCompression |
| If rohc is configured, the UE shall apply the configured ROHC profile(s) in both uplink and downlink. If uplinkOnlyROHC is configured, the UE shall apply the configured ROHC profile(s) in uplink (there is no header compression in downlink). ROHC can be configured for any bearer type. ROHC and EHC can be both configured simultaneously for a DRB. The network reconfigures headerCompression only upon reconfiguration involving PDCP re-establishment. Network configures headerCompression to notUsed when outOfOrderDelivery is configured. |
| integrityProtection |
| Indicates whether or not integrity protection is configured for this radio bearer. The network configures all DRBs with the same PDU-session ID with same value for this field. The value for this field cannot be changed after the DRB is set up. |
| maxCID |
| Indicates the value of the MAX_CID parameter as specified in TS 38.323 [5]. The total value of MAX_CIDs across all bearers for the UE should be less than or equal to the value of maxNumberROHC-ContextSessions parameter as indicated by the UE. |
| moreThanOneRLC |
| This field configures UL data transmission when more than one RLC entity is associated with the PDCP entity. |
| moreThanTwoRLC |
| This field configures UL data transmission when more than two RLC entities are associated with the PDCP entity. The presence of this field indicates that PDCP duplication is configured. PDCP duplication is not configured for CA packet duplication of LTE RLC bearer. |
| outOfOrderDelivery |
| Indicates whether or not outOfOrderDelivery specified in TS 38.323 [5] is configured. This field should be either always present or always absent, after the radio bearer is established. |
| pdcp-Duplication |
| Indicates whether or not uplink duplication status at the time of receiving this IE is configured and activated as specified in TS 38.323 [5]. The presence of this field indicates that duplication is configured. PDCP duplication is not configured for CA packet duplication of LTE RLC bearer. The value of this field, when the field is present, indicates the initial state of the duplication. If set to true, duplication is activated. The value of this field is always true, when configured for a SRB. This field is absent, if the field moreThanTwoRLC is present. |
| pdcp-SN-SizeDL |
| PDCP sequence number size for downlink, 12 or 18 bits, as specified in TS 38.323 [5]. For SRBs only the value len12bits is applicable. The value for this field cannot be changed in case of reconfiguration with sync, if dapsConfig is configured for this bearer. |
| pdcp-SN-SizeUL |
| PDCP sequence number size for uplink, 12 or 18 bits, as specified in TS 38.323 [5]. For SRBs only the value len12bits is applicable. The value for this field cannot be changed in case of reconfiguration with sync, if dapsConfig is configured for this bearer. |
| primaryPath |
| Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. |
| splitSecondaryPath |
| Indicates the LCID of the split secondary RLC entity as specified in TS 38.323 [5] for fallback to split bearer operation when UL data transmission with more than two RLC entities is associated with the PDCP entity. This RLC entity belongs to a cell group that is different from the cell group indicated by cellGroup in the field primaryPath. Editor's Note: The name splitSecondaryPath needs to be confirmed, and the impacts on the legacy split bearer operation (if any) may need to be considered. |
| statusReportRequired |
| For AM DRBs, indicates whether the DRB is configured to send a PDCP status report in the uplink, as specified in TS 38.323 [5]. |

DCP-Config field descriptions t-Reordering

Value in ms of t-Reordering specified in TS 38.323 [5]. Value ms0 corresponds to 0 ms, value ms20 corresponds to 20 ms, value ms40 corresponds to 40 ms, and so on. When the field is absent the UE applies the value infinity. The value for this field cannot be changed in case of reconfiguration with sync, if dapsConfig is configured for this bearer.
ul-DataSplitThreshold Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied.

| Conditional presence | Explanation |
| --- | --- |
| DRB | This field is mandatory present when the corresponding DRB is being set up, absent for SRBs. Otherwise this field is optionally present, need M. |
| DRB-Only | This field is optionally present in case of DRB, need M. Otherwise, it is absent for SRBs. |
| MoreThanOneRLC | This field is mandatory present upon RRC reconfiguration with setup of a PDCP entity for a radio bearer with more than one associated logical channel and upon RRC reconfiguration with the association of additional logical channels to the PDCP entity. The field is also mandatory present in case the field moreThanTwoRLC is included in PDCP-Config. Upon RRC reconfiguration when a PDCP entity is associated with multiple logical channels, this field is optionally present need M. Otherwise, this field is absent. Need R. |
| MoreThanTwoRLC | This field is mandatory present upon RRC reconfiguration with setup of a PDCP entity for a radio bearer with more than two associated logical channels and upon RRC reconfiguration with the association of more than one additional logical channel to the PDCP entity. Upon RRC reconfiguration when none of the RLC entities is re-established, this field is optionally present, Need M. Otherwise, the field is absent, Need R. |
| Rlc-AM | For RLC AM, the field is optionally present, need R. Otherwise, the field is absent. |
| Setup | The field is mandatory present in case of radio bearer setup. Otherwise the field is optionally present, need M. |
| SplitBearer | The field is absent for SRBs. Otherwise, the field is optional present, need M, in case of radio bearer with more than one associated RLC mapped to different cell groups. |
| SplitBearer2 | The field is mandatory present, in case of a split radio bearer. Otherwise the field is absent. |
| ConnectedTo5GC | The field is optionally present, need R, if the UE is connected to 5GC. Otherwise the field is absent. |
| ConnectedTo5GC1 | The field is optionally present, need R, if the UE is connected to NR/5GC. Otherwise the field is absent. |
| Setup2 | This field is mandatory present in case for radio bearer setup for RLC-AM and RLC-UM. Otherwise, this field is absent, Need M. |

Buffer Status Reporting

In NR, Buffer Status Reports (BSRs) are used for requesting UL-SCH resources when a UE needs to send new data. Essentially, there are 8 buffers in MAC entity of a UE, each one can store data/traffic for a group of logical channels (called Logical Channel Group (LCG)) depending on the mapping configuration. The mapping of a logical channel to an LCG is done at the time when the logical channel is setup by gNB, which may be based on QoS profile of the channel. Responding to BSR, the network (gNB) may grant UL radio resources to the UE for transmitting the queued data. The radio resource granted to the UE may be used to transmit data from one or more logical channel depending on the priorities of the logical channels.

There are three types of BSR: Regular BSR, Periodic BSR, and Padding BSR. Each type has different triggering conditions. A BSR is triggered if any of the following events occur [TS 38.321]:

Regular BSR: the MAC entity has new UL data available for a logical channel which belongs to an LCG; and either
 the new UL data belongs to a logical channel with higher priority than the priority of any logical channel containing available UL data which belong to any LCG; or
 none of the logical channels which belong to an LCG contains any available UL data Padding BSR: UL resources are allocated and number of padding bits is equal to or larger than the size of the BSR MAC CE plus its sub-header.

Periodic BSR: triggered periodically based on a timer called periodicBSR-Timer.

In addition, a pre-emptive BSR can be triggered by an integrated access backhaul mobile termination, IAB-MT, when an IAB node provides an UL grant to a child IAB node or UE, and/or when it receives a BSR from a child IAB node or a UE.

The Buffer Size field includes the total amount of data available which is calculated as specified in 3GPP TS 38.322 and TS 38.323, across all logical channels of a logical channel group after the MAC PDU has been built i.e. after the logical channel prioritization procedure.

The following sub sections about BSR are taken from TS 38.321

Buffer Status Reporting

The Buffer Status reporting (BSR) procedure is used to provide the serving gNB with information about UL data volume in the MAC entity. In the case of IAB, it is additionally used by an IAB-MT to provide its parent IAB-DU with the information about the amount of the data expected to arrive at the MT of the IAB node from its child node(s) and or UE(s) connected to it. This BSR is referred to as Pre-emptive BSR.

For BSR other than Pre-emptive BSR, RRC configures the following parameters to control the BSR:
periodicBSR-Timer;
retxBSR-Timer;
logicalChannelSR-DelayTimerApplied;
logicalChannelSR-DelayTimer;
logicalChannelSR-Mask;
logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR other than Pre-emptive BSR shall be triggered if any of the following events occur:
UL data, for a logical channel which belongs to an LCG, becomes available to the MAC entity; and either
  this UL data belongs to a logical channel with higher priority than the priority of any logical channel containing available UL data which belong to any LCG; or
  none of the logical channels which belong to an LCG contains any available UL data.
in which case the BSR is referred below to as 'Regular BSR';
UL resources are allocated and number of padding bits is equal to or larger than the size of the Buffer Status Report MAC CE plus its subheader, in which case the BSR is referred below to as 'Padding BSR';
retxBSR-Timer expires, and at least one of the logical channels which belong to an LCG contains UL data, in which case the BSR is referred below to as 'Regular BSR';
periodicBSR-Timer expires, in which case the BSR is referred below to as 'Periodic BSR'.
NOTE 1: When Regular BSR triggering events occur for multiple logical channels simultaneously, each logical channel triggers one separate Regular BSR.

If configured, Pre-emptive BSR may be triggered for the specific case of an IAB-MT if any of the following events occur:
UL grant is provided to child IAB node or UE;
BSR is received from child IAB node or UE.

For Regular BSR, the MAC entity shall:
1> if the BSR is triggered for a logical channel for which logicalChannelSR-DelayTimerApplied with value true is configured by upper layers:
  2> start or restart the logicalChannelSR-DelayTimer.
1> else:
  2> if running, stop the logicalChannelSR-DelayTimer.

For Regular and Periodic BSR, the MAC entity shall:
1> if more than one LCG has data available for transmission when the MAC PDU containing the BSR is to be built:
  2> report Long BSR for all LCGs which have data available for transmission.
1> else:
  2> report Short BSR.
For Padding BSR, the MAC entity shall:
1> if the number of padding bits is equal to or larger than the size of the Short BSR plus its subheader but smaller than the size of the Long BSR plus its subheader:
  2> if more than one LCG has data available for transmission when the BSR is to be built:
    3> if the number of padding bits is equal to the size of the Short BSR plus its subheader:
      4> report Short Truncated BSR of the LCG with the highest priority logical channel with data available for transmission.
    3> else:
      4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
  2> else:
    3> report Short BSR.
1> else if the number of padding bits is equal to or larger than the size of the Long BSR plus its subheader:
  2> report Long BSR for all LCGs which have data available for transmission.
For Pre-emptive BSR, the MAC entity shall:
1> report Pre-emptive BSR.
For BSR triggered by retxBSR-Timer expiry, the MAC entity considers that the logical channel that triggered the BSR is the highest priority logical channel that has data available for transmission at the time the BSR is triggered.

The MAC entity shall:
1> if the Buffer Status reporting procedure determines that at least one BSR other than Pre-emptive BSR has been triggered and not cancelled:
  2> if UL-SCH resources are available for a new transmission and the UL-SCH resources can accommodate the BSR MAC CE plus its subheader as a result of logical channel prioritization:
    3> instruct the Multiplexing and Assembly procedure to generate the BSR MAC CE(s);
    3> start or restart periodicBSR-Timer except when all the generated BSRs are long or short Truncated BSRs;
    3> start or restart retxBSR-Timer.
  2> if a Regular BSR has been triggered and logicalChannelSR-DelayTimer is not running:
    3> if there is no UL-SCH resource available for a new transmission; or
    3> if the MAC entity is configured with configured uplink grant(s) and the Regular BSR was triggered for a logical channel for which logicalChannelSR-Mask is set to false; or
    3> if the UL-SCH resources available for a new transmission do not meet the LCP mapping restrictions (see clause 5.4.3.1) configured for the logical channel that triggered the BSR:
      4> trigger a Scheduling Request.

1> if the Buffer Status reporting procedure determines that at least one Pre-emptive BSR has been triggered and not cancelled:
  2> if UL-SCH resources are available for a new transmission and the UL-SCH resources can accommodate the Pre-emptive BSR MAC CE plus its subheader as a result of logical channel prioritization:
    3> instruct the Multiplexing and Assembly procedure to generate the Pre-emptive BSR MAC CE.
  2> else:
    3> trigger a Scheduling Request.

NOTE 2: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

For the case when Pre-emptive BSR is being sent, a MAC PDU may contain one BSR MAC CE for Pre-emptive BSR, and one BSR MAC CE for BSR other than Pre-emptive BSR. A MAC PDU not containing a BSR MAC CE for Pre-emptive BSR shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs other than Pre-emptive BSR may be cancelled when the UL grant(s) can accommodate all pending data available for transmission but is not sufficient to additionally accommodate the BSR MAC CE plus its subheader. All BSRs other than Pre-emptive BSR triggered prior to MAC PDU assembly shall be cancelled when a MAC PDU is transmitted, regardless of LBT failure indication from lower layers, and this PDU includes a Long or Short BSR MAC CE which contains buffer status up to (and including) the last event that triggered a BSR prior to the MAC PDU assembly. A Pre-emptive BSR shall be cancelled when a MAC PDU is transmitted and this PDU includes the corresponding Pre-emptive BSR MAC CE.

NOTE 3: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

NOTE 4: Pre-emptive BSR may be used for the case of dual-connected IAB node. It is up to network implementation to work out the associated MAC entity or entities, and the associated expected amount of data. For the case of dual-connected IAB node, there may be ambiguity in Pre-emptive BSR calculations and interpretation by the receiving nodes in case where BH RLC channels mapped to different egress Cell Groups are not mapped to different ingress LCGs.

NOTE 5: If a HARQ process is configured with cg-RetransmissionTimer and if the BSR is already included in a MAC PDU for transmission by this HARQ process, but not yet transmitted by lower layers, it is up to UE implementation how to handle the BSR content.

Buffer Status Report MAC CEs

Buffer Status Report (BSR) MAC CEs consist of either:
Short BSR format (fixed size); or
Long BSR format (variable size); or
Short Truncated BSR format (fixed size);
Long Truncated BSR format (variable size); or
Pre-emptive BSR format (variable size).

The BSR formats are identified by MAC subheaders with LCIDs as specified in Table 6.2.1-2.

The fields in the BSR MAC CE are defined as follows and illustrated in FIG. 12 (short BSR and Short Truncated BSR MAC CE) and FIG. 13 (Long BSR, Long Truncate BSR, and Pre-emptive BSR MAC-CE):

LCG ID: The Logical Channel Group ID field identifies the group of logical channel(s) whose buffer status is being reported. The length of the field is 3 bits;

$LCG_i$: For the Long BSR format, this field indicates the presence of the Buffer Size field for the logical channel group i. The $LCG_i$ field set to 1 indicates that the Buffer Size field for the logical channel group i is reported. The $LCG_i$ field set to 0 indicates that the Buffer Size field for the logical channel group i is not reported. For the Long Truncated BSR format, this field indicates whether logical channel group i has data available. The $LCG_i$ field set to 1 indicates that logical channel group i has data available. The $LCG_i$ field set to 0 indicates that logical channel group i does not have data available;

Buffer Size: The Buffer Size field identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. For the Long BSR format and the Long Truncated BSR format, the Buffer Size fields are included in ascending order based on the $LCG_i$. For the Long Truncated BSR format the number of Buffer Size fields included is maximized, while not exceeding the number of padding bits. For the Pre-emptive BSR, the Buffer Size field identifies the total amount of the data expected to arrive at the IAB-MT of the node where the Pre-emptive BSR is triggered. Pre-emptive BSR is identical to the Long BSR format.

SUMMARY

In dual connectivity, the UE can perform UL/DL transmissions/receptions towards a Master Node (MN) and/or Secondary Node (SN) (for data transmission/reception using the associated MCG and/or SCG radio links). In typical scenarios, the MCG can be considered to offer basic coverage and the SCG used to increase the data rate during data bursts. The UE needs to continuously monitor the PDCCH for uplink and downlink scheduling assignments at least on the PCell and the PSCell, and potentially all other SCells if cross carrier scheduling is not employed. Even if cross carrier scheduling is employed, the UE has to perform extra PDCCH monitoring on the PCell or the PSCell for the sake of the SCell, depending on whether the SCell belongs to the MCG or the SCG. This monitoring can increase UE power consumption, and thus reduce battery life.

In order to improve network energy efficiency and UE battery life for UEs in MR-DC, a Rel-17 work item is planned to introduce efficient SCG/SCell activation/deactivation. This can be especially important for MR-DC configurations with NR SCG, as it has been evaluated in RP-190919 that in some cases NR UE power consumption is 3 to 4 times higher than LTE.

As previously discussed, 3GPP has specified the concepts of dormant SCell (in LTE) and dormancy like behavior of an SCell (for NR). However, only SCells can be put to put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution could be releasing (for power savings) and adding (when traffic demands requires) the SCG on a need basis. However, traffic is likely to be bursty, and adding and releasing the SCG involves a significant amount of RRC signaling and inter-node messaging between the MN and the SN, which causes considerable delay as previously described.

In rel-16, some discussions were made regarding putting also the PSCell in dormancy, also referred to as SCG Suspension. Some preliminary agreements were made in RAN2-107 bis, October 2019 (see chairman notes at R2-1914111601):

R2 assumes the following (can be slightly modified due to progress on Scell dormancy):
  The UE supports network-controlled suspension of the SCG in RRC_CONNECTED.
  UE behavior for a suspended SCG is FFS
  The UE supports at most one SCG configuration, suspended or not suspended, in Rel16.
  In RRC_CONNECTED upon addition of the SCG, the SCG can be either suspended or not suspended by configuration.

In RAN-2 108, further discussion was made to clarify the above FFSs.

Some solutions have been proposed in Rel-16, but these have different problems. For example, in R2-1908679 (Introducing suspension of SCG—Qualcomm) the paper proposes that gNB can indicate UE to suspend SCG transmissions when no data traffic is expected to be sent in SCG so that UE keeps the SCG configuration but does not use it for power saving purpose. Therein, it is mentioned that signaling to suspend SCG could be based on DCI/MAC-CE/RRC signaling, but no details were provided regarding the configuration from the gNB to the UE. And, differently from the defined behavior for SCell(s), PSCell(s) may be associated to a different network node (e.g. a gNodeB operating as Secondary Node).

In some scenarios there might be internal conditions at a UE that is operating in MR-DC for which it could be beneficial to suspend the SCG. However, as these conditions are internal at the UE, the network that is responsible for suspending the UE, is not aware of them. Similarly, there could also be internal conditions for a UE with suspended SCG, for which it could be beneficial to resume the suspended SCG. These conditions are also unknown at the network. If SCG suspension and resumption is only based on network conditions, it could lead to inefficient usage of possibly available resources or unnecessary energy/power consumption at the UE and the network.

Various embodiments of inventive concepts enable the operating mode of the SCG to be changed on a need basis considering the current internal conditions at a UE (e.g. UL buffer status, arrival of UL data for a suspended bearer, UE battery level, mobility state, overheating level, etc.), instead of just relying on conditions that can be monitored at the network (e.g. DL buffer status).

According to some embodiments of inventive concepts, a method performed by a wireless terminal operating in Multi-Radio Dual Connectivity (MR-DC) and configured with a first cell group associated with a first network node and a second cell group associated with a second network node is provided. The method includes monitoring conditions and events for indicating that an operating mode of the second cell group should be modified. The method includes transmitting an indication to a network requesting a modification for the operating mode of the second cell group responsive to the monitoring indicating the operating mode of the second cell group should be modified. The method includes receiving a command from the network to change the operating mode of the second cell group. The method includes responsive to receiving the command, applying the command and start operating the second cell group in the indicated operating mode.

A wireless terminal having analogous operations is provided in other embodiments of inventive concepts.

According to further embodiments of inventive concepts, a method performed by a first network node serving a wireless terminal configured with Multi-Radio Dual Connectivity (MR-DC) and configured with a first cell group and a second cell group is provided. The method includes receiving, from the wireless terminal, an indication requesting a modification for an operating mode of the second cell group. The method includes transmitting a command to the wireless terminal to change the operating mode of the second cell group. The method includes performing procedures for the second cell group according to the operating mode changed by the command.

A first network nodes having analogous operations is provided in other embodiments of inventive concepts.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 28 is a block diagram of methods implemented in a communication system including a host computer, a base station and a user equipment in accordance with some embodiments; and FIG. 29 is a block diagram of methods implemented in a communication system including a host computer, a base station and a user equipment in accordance with some embodiments.

DETAILED DESCRIPTION

Figure 1:
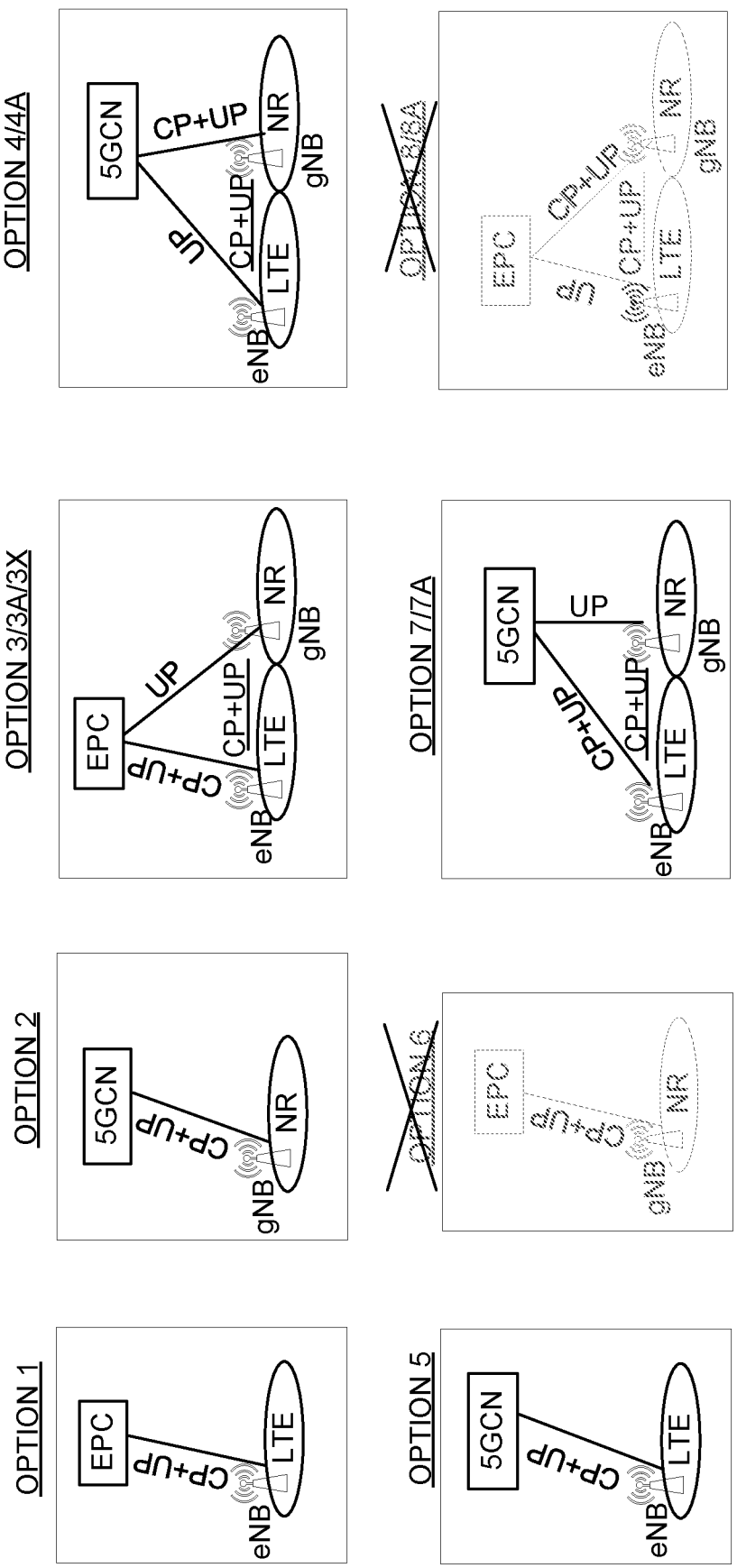
FIG. 1 is an illustration of LTE and NR interworking options.
Figure 2:
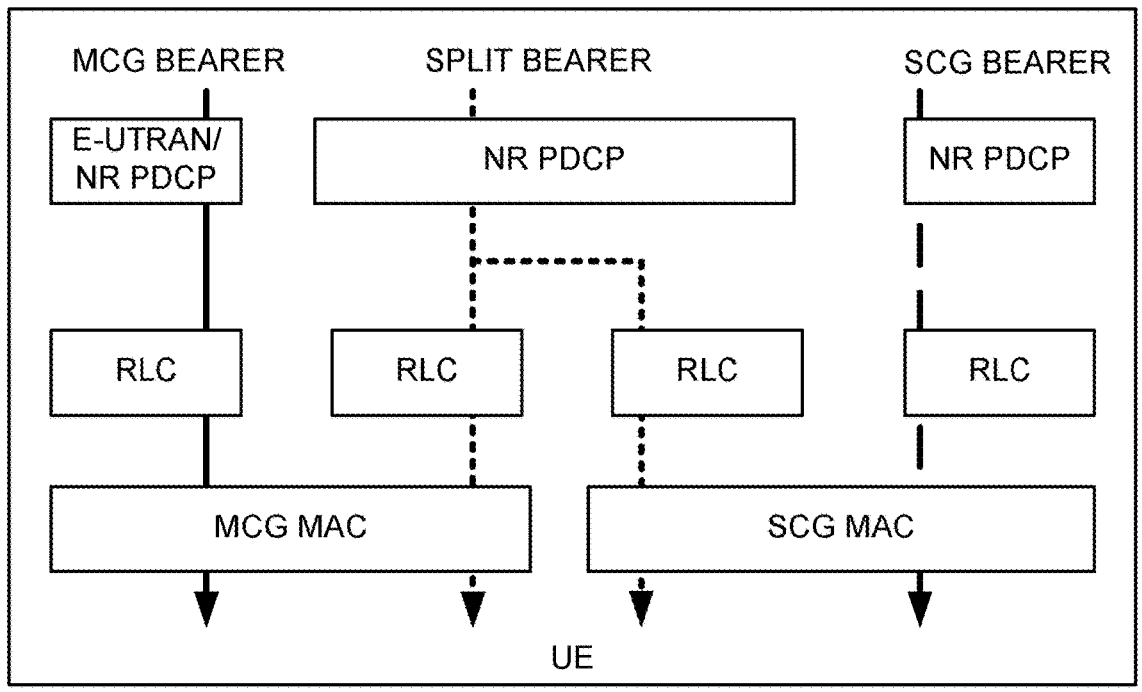
FIG. 2 is an illustration of radio bearer types in MR-DC.
Figure 3:
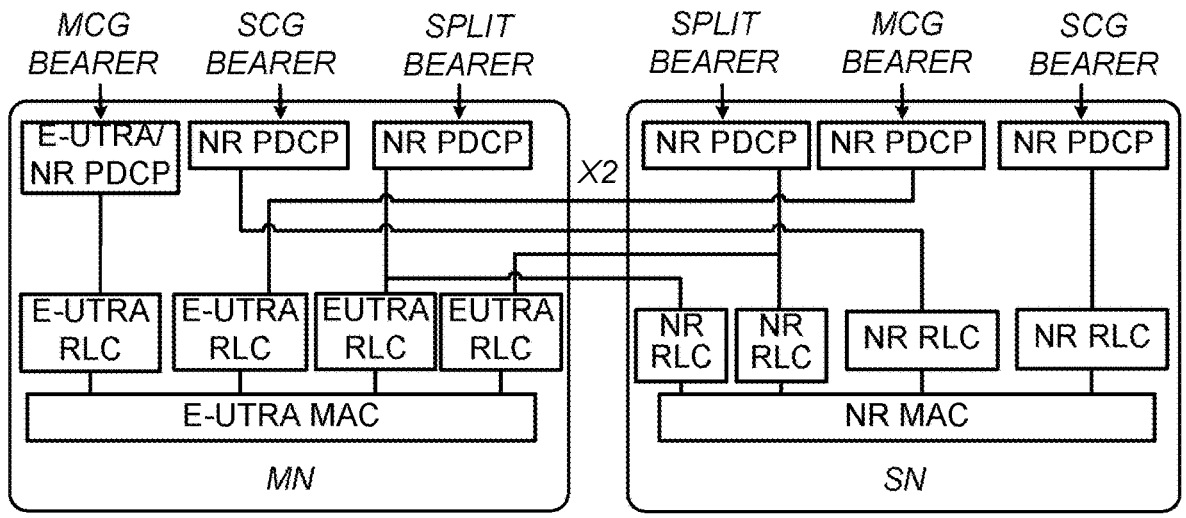
FIG. 3 is an illustration of network side protocol termination options for MCG, SCG and split bearers in MR-DC with EPC (EN-DC)
Figure 4:
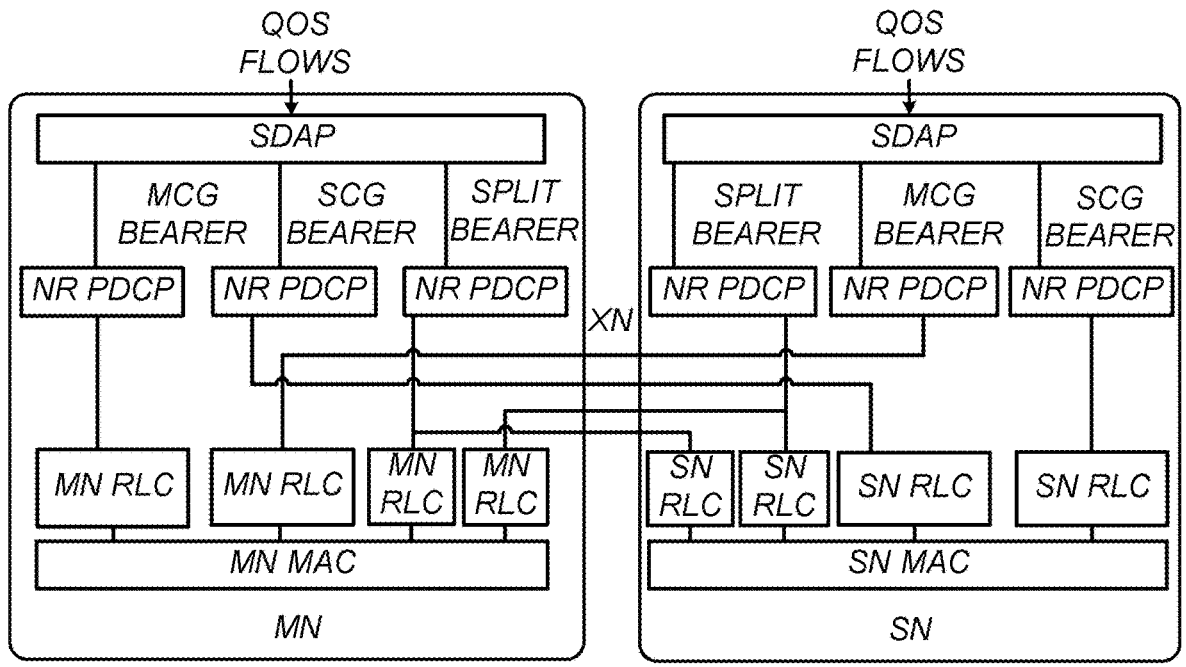
FIG. 4 is an illustration of network side radio protocol termination options for MCG, SCG and split bearers in the MN and SN for MR-DC with 5GC.
Figure 5:
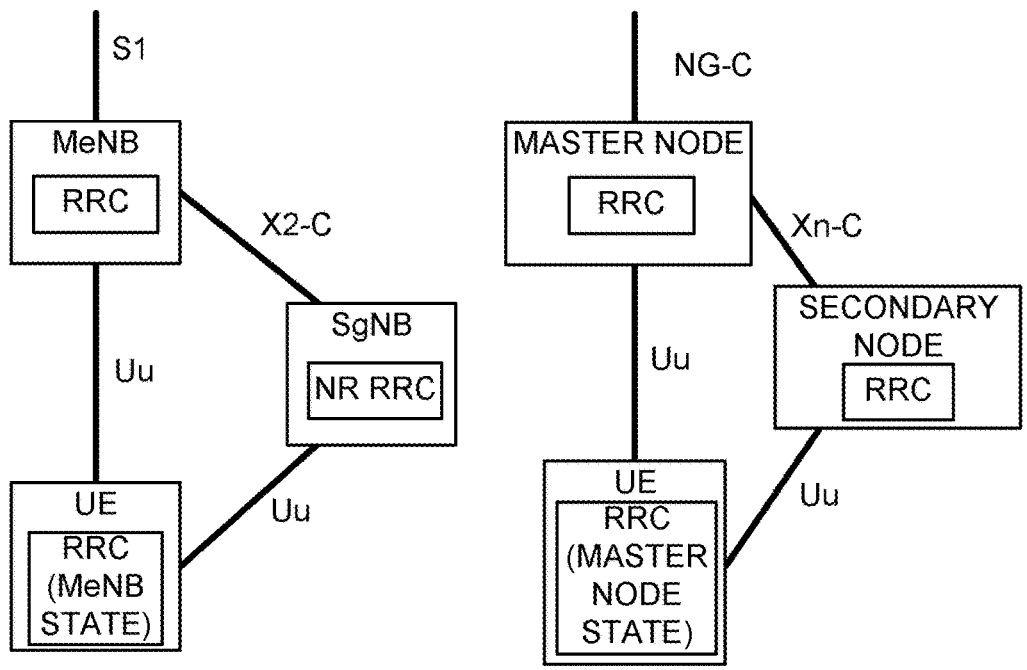
FIG. 5 is an illustration of control plane architecture for EN-DC (left) and MR-DC with 5GC (right)
Figure 6:
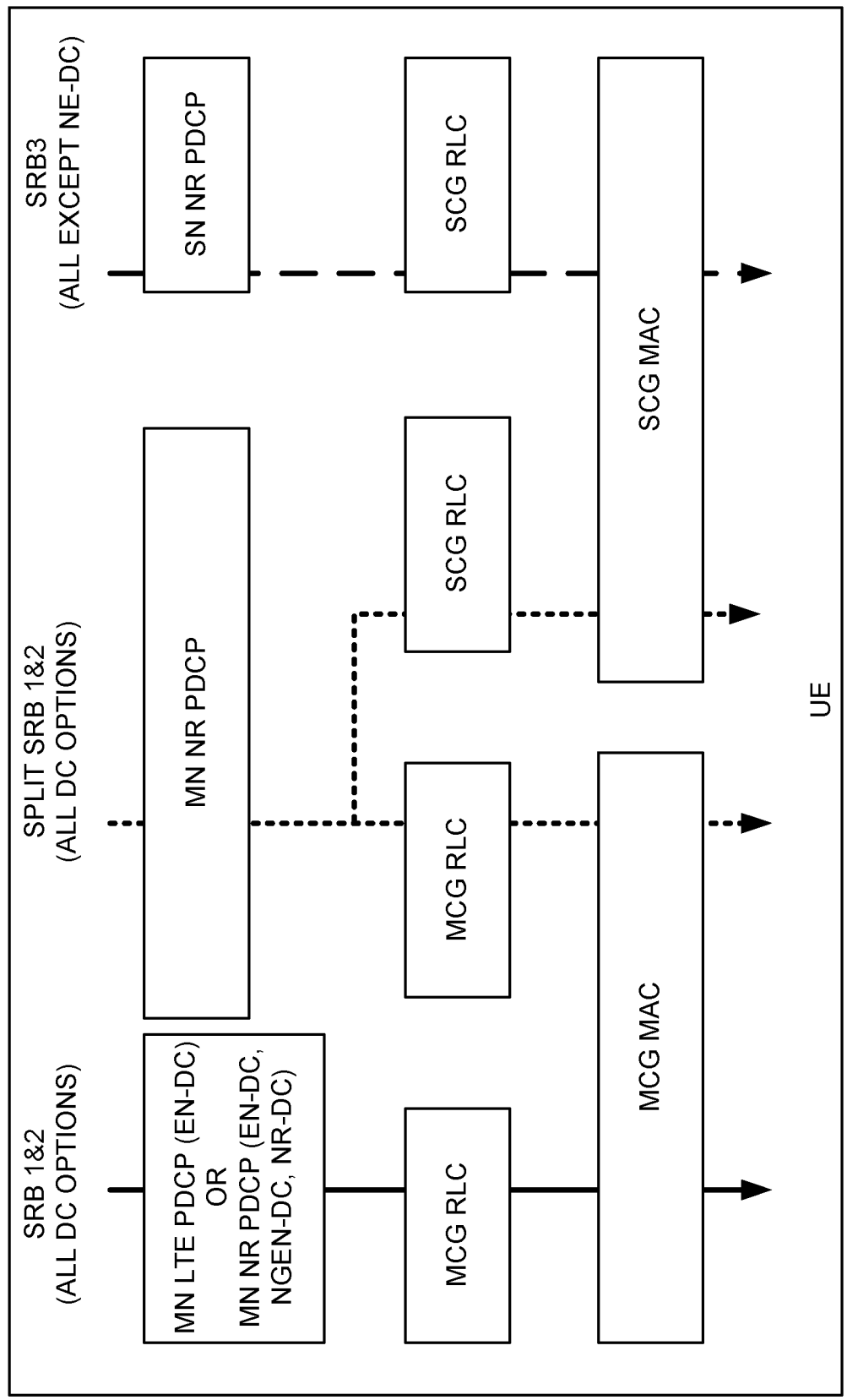
FIG. 6 is an illustration of network side protocol termination options for SRBs in MR-DC.
Figure 7:
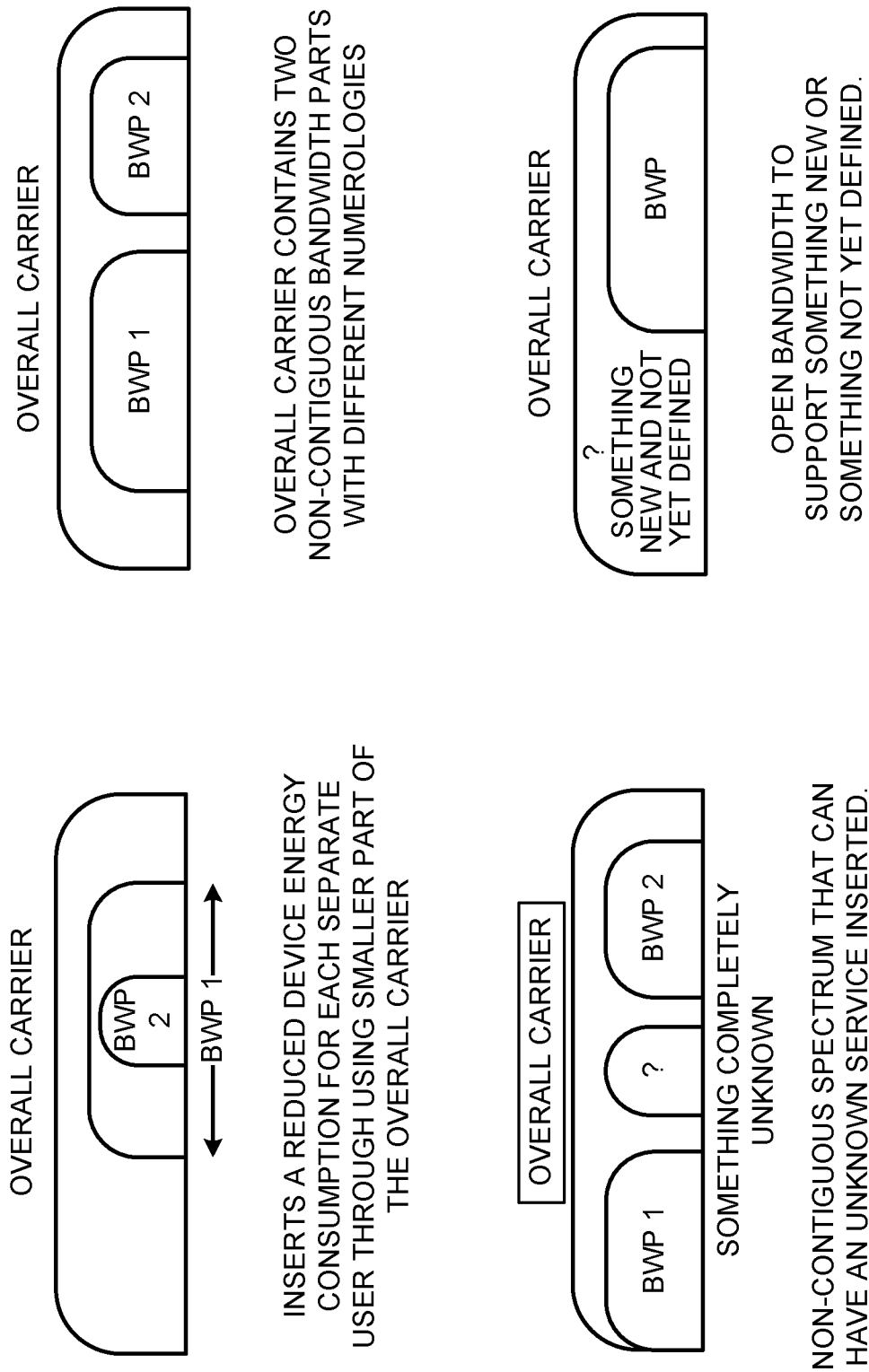
FIG. 7 is an illustration of bandwidth parts.
Figure 8:
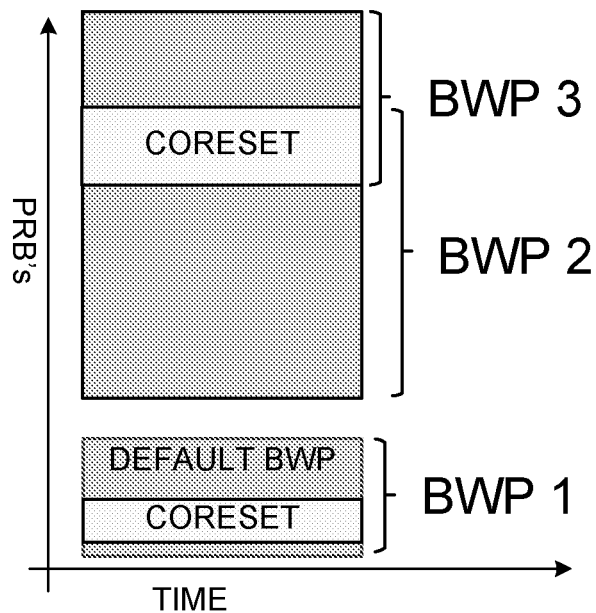
FIG. 8 is another illustration of bandwidth parts.
Figure 12:
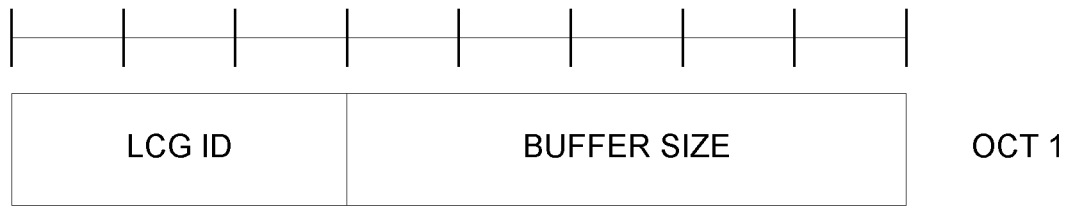
FIG. 12 is an illustration of Short BSR and Short Truncated BSR MAC CE.
Figure 13:
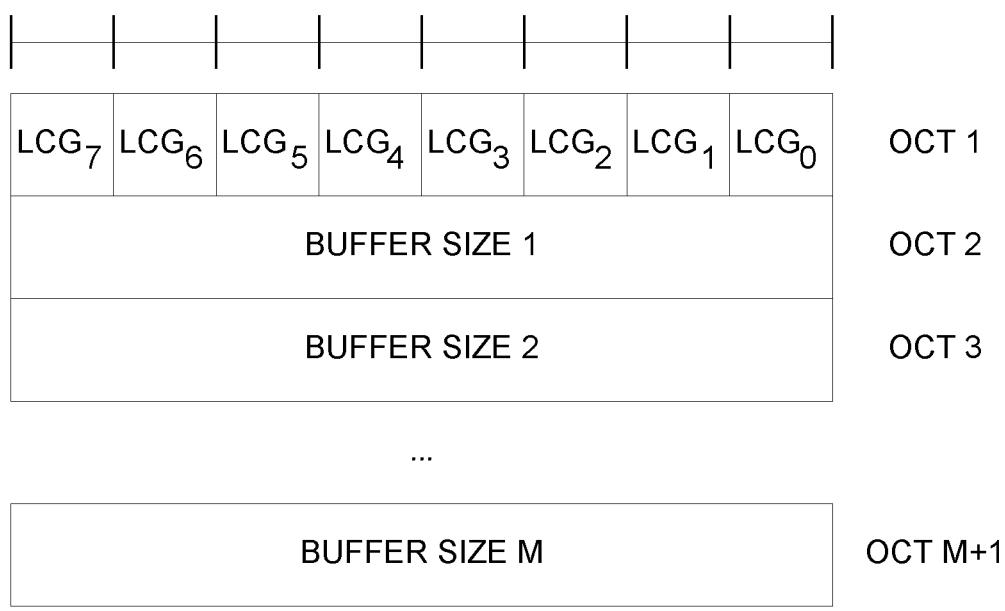
FIG. 13 is an illustration of Long BSR, Long Truncated BSR, and Pre-emptive BSR MAC CE.
Figure 9:
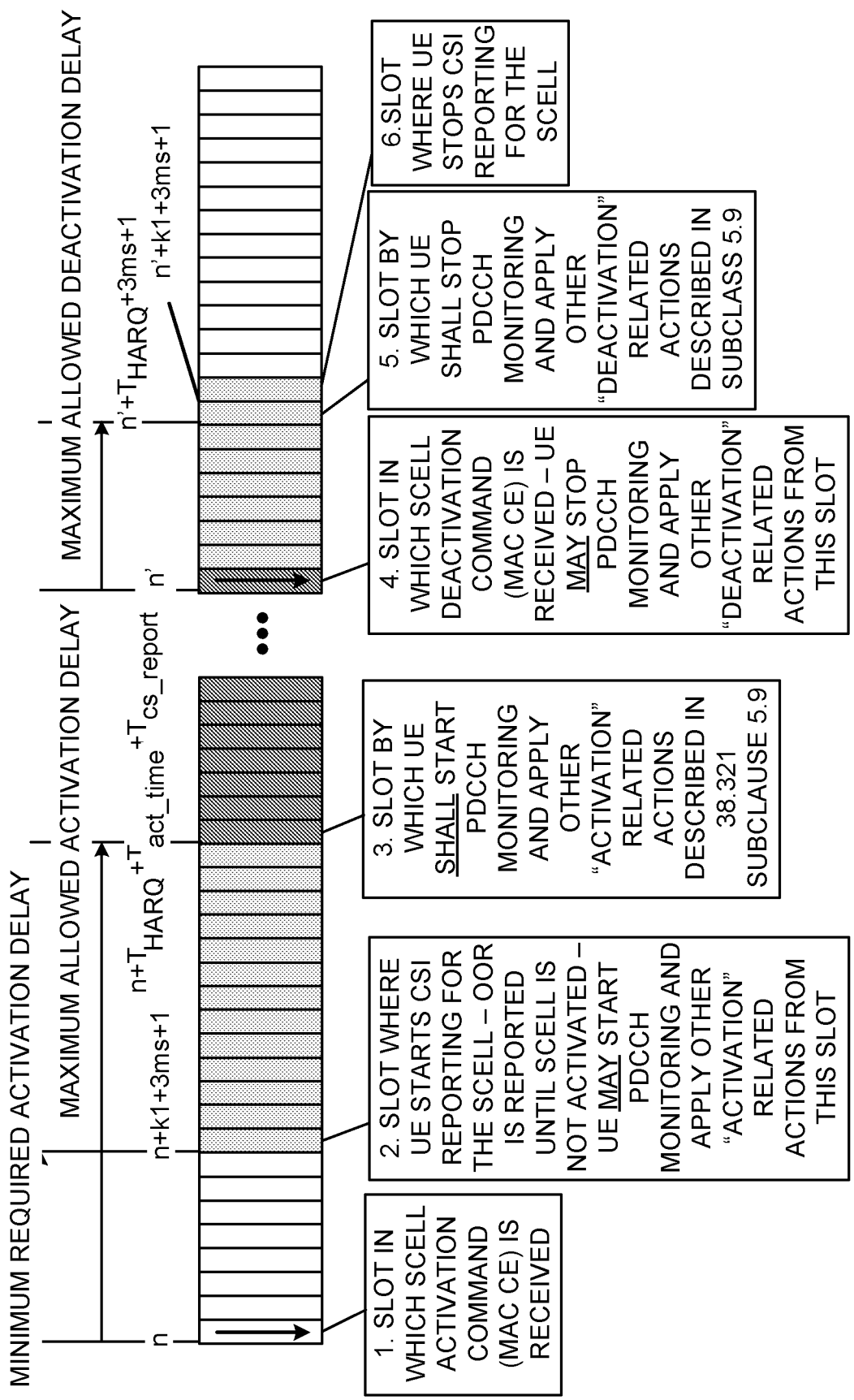
FIG. 9 is an illustration of activation/deactivation of SCells.
Figure 10:
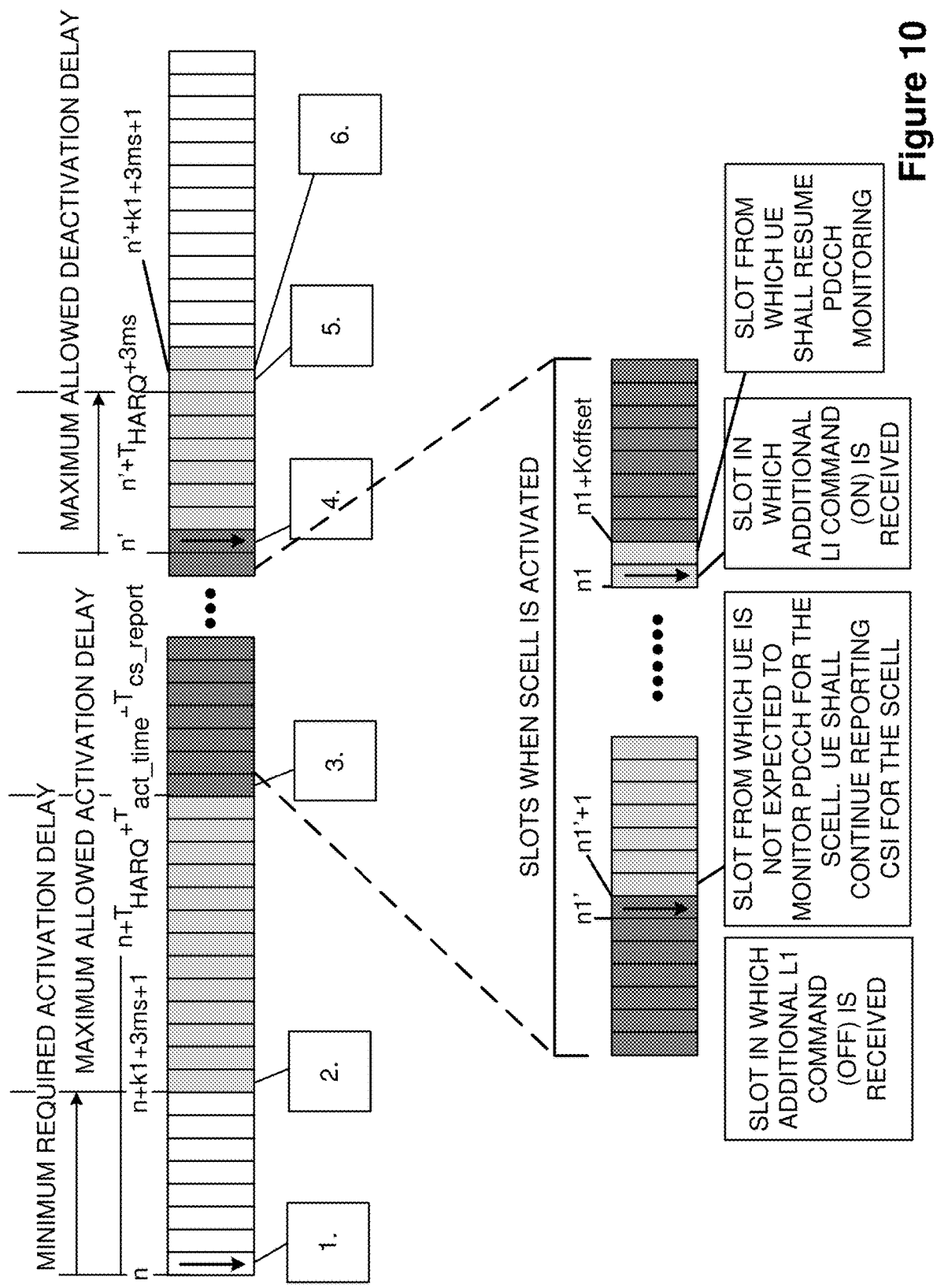
FIG. 10 is an illustration of dormant state SCells in LTE.
Figure 11:
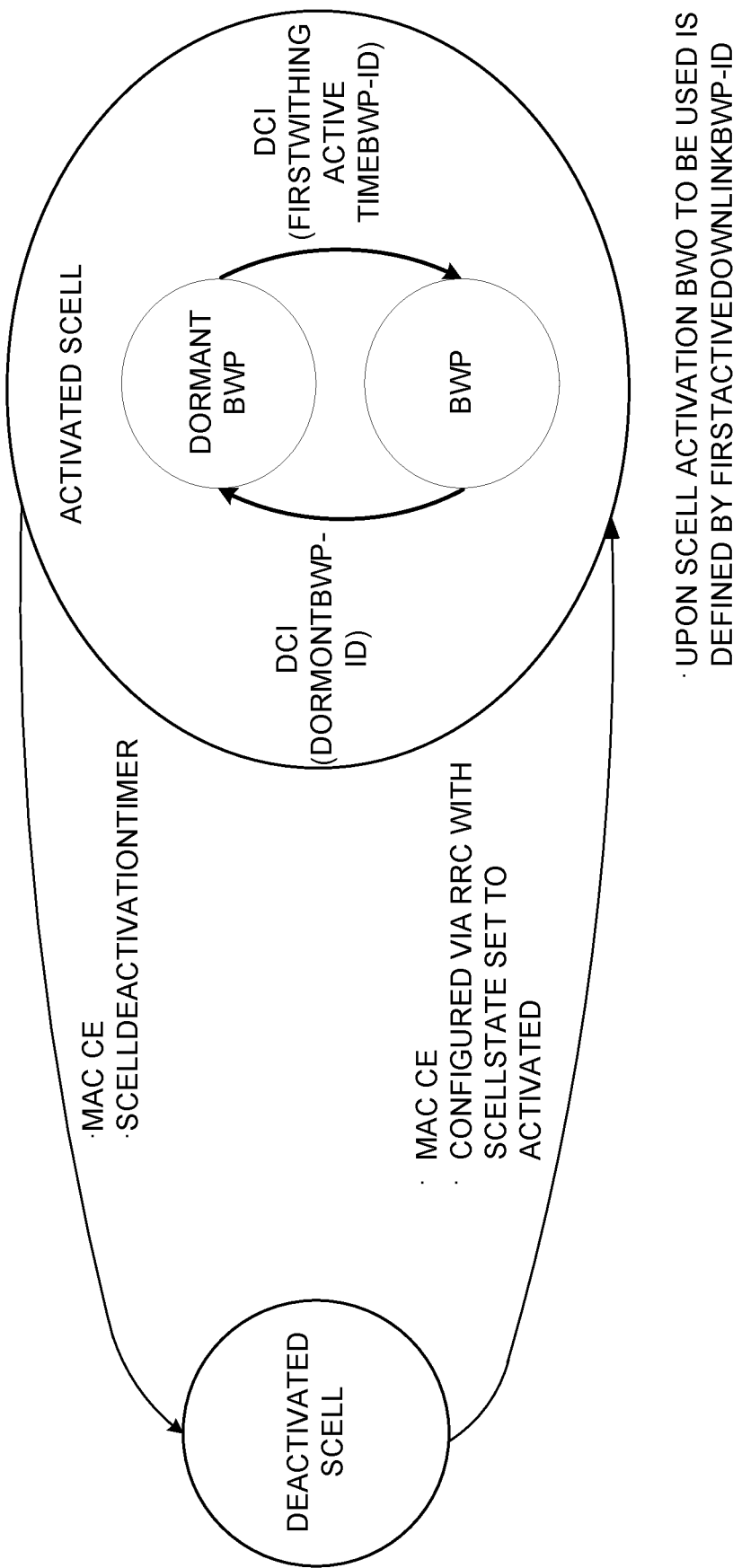
FIG. 11 is an illustration of dormancy like behavior for SCells in NR.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As used herein, the term suspending an SCG can correspond to any of the following:

The UE starting to operate the PSCell in dormancy, e.g. switching the PSCell to a dormant BWP). On the network side, the network considers the PSCell in dormancy and at least stops transmitting PDCCH for that UE in the PSCell(s);

The UE deactivating the PSCell like SCell deactivation; On the network side, the network considers the PSCell as deactivated and at least stops transmitting PDCCH for that UE in the PSCell;

The UE suspending its operation with the SCG (e.g. suspending bearers associated with the SCG, like SCG MN-/SN-terminated bearers), but keeping the SCG configuration stored (referred to as Stored SCG); On the network side there can be different alternatives such as the SN storing the SCG as the UE does, or the SN releasing the SCG context of the UE to be generated again upon resume (e.g. with the support from the MN that is the node storing the SCG context for that UE whose SCG is suspended). More details are provided later.

The description herein may also use suspended SCG, SCG suspended, or, when referring to the action of transitioning to suspended SCG, it may use suspending the SCG.

As used herein, the term resuming an SCG can correspond to any of the following:

The UE transitioning the PSCell from dormancy like behavior to normal active cell behavior (e.g. by switching the PSCell to a non-dormant BWP), and at least starting to monitor PDCCH of one of the cells of the SCG; This transition could be triggered e.g. by network signaling;

The UE activating the PSCell and at least starting to monitor PDCCH of one of the cells of the SCG; This transition could be triggered e.g. by network signaling;

The UE restoring the stored SCG configuration and start operating according to the SCG configuration that is resumed (e.g. resumption of SCG bearers);

The UE restoring the stored SCG configuration and receiving a message with an SCG configuration (e.g. delta signaling) to be applied on top of the stored SCG configuration that is restored.

The description herein may also use the term resumed SCG, SCG resume, or, when referring to the action of transitioning to active/resumed SCG, it may use resuming the SCG.

Various embodiments of inventive concepts described herein describe a UE that is MR-DC capable i.e. that can be configured with a Master Cell Group (MCG), associated to a network node operating as Master Node (MN), and a Secondary Cell Group (SCG), associated to a network node operating as Secondary Node (SN). The network node operating as MN can be a gNodeB (of NR technology) or an eNodeB (LTE node connected to EPC), or an ng-eNodeB (LTE node connected to 5GC). The network node operating as SN can be a gNodeB (of NR technology) or an eNodeB, or an ng-eNodeB. A possible combination can be both MN and SN being gNodeB(s) and in that case both MCG and SCG have configured NR cells. Another possible combination can be an MN being an eNodeB and SN being gNodeB(s) and in that case the MCG have configured LTE cells, while the SCG have configured NR cells, so the UE is configured with inter-RAT Dual Connectivity. Even if we have used LTE and NR as different RATs, this should be interpreted as examples, so the method is applicable for inter-RAT Dual Connectivity with any two different RATs. Or, in an intra-RAT manner.

Figure 14:
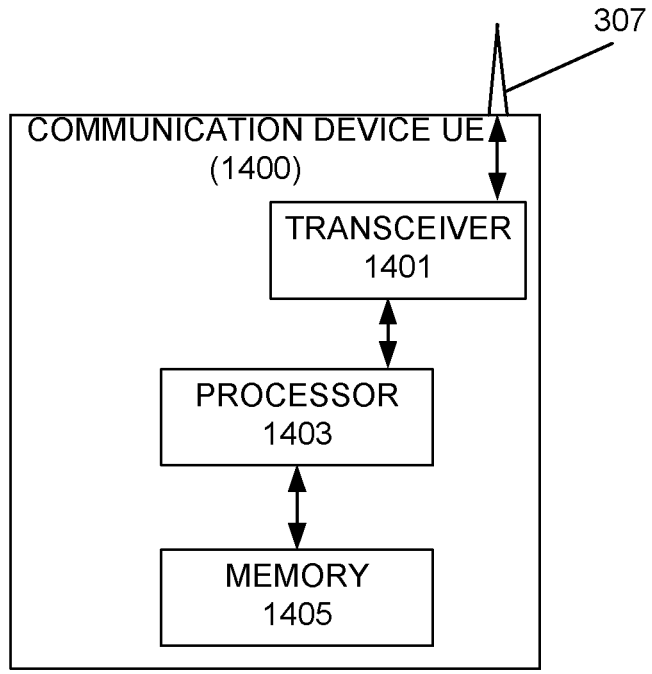
FIG. 14 is a block diagram illustrating a wireless device UE according to some embodiments of inventive concepts.

FIG. 14 is a block diagram illustrating elements of a wireless terminal 1400 (also referred to as a mobile terminal, a mobile communication terminal, a wireless device, a wireless communication device, a communication device, mobile device, a wireless communication terminal, user equipment, UE, a user equipment node/terminal/device, etc.) configured to provide wireless communication according to embodiments of inventive concepts. (Wireless terminal 1400 may be provided, for example, as discussed below with respect to wireless device 4110 of FIG. 21.) As shown, wireless terminal 1400 may include an antenna 1407 (e.g., corresponding to antenna 4111 of FIG. 21), and transceiver circuitry 1401 (also referred to as a transceiver, e.g., corresponding to interface 4114 of FIG. 21) including a transmitter and a receiver configured to provide uplink and downlink radio communications with a base station(s) (e.g., corresponding to network node 4160 of FIG. 21, also referred to as a RAN node) of a radio access network. Wireless terminal may also include processing circuitry 1403 (also referred to as a processor, e.g., corresponding to processing circuitry 4120 of FIG. 21) coupled to the transceiver circuitry, and memory circuitry 1405 (also referred to as memory, e.g., corresponding to device readable medium 4130 of FIG. 21) coupled to the processing circuitry. The memory circuitry 1405 may include computer readable program code that when executed by the processing circuitry 1403 causes the processing circuitry to perform operations according to embodiments disclosed herein. According to other embodiments, processing circuitry 1403 may be defined to include memory so that separate memory circuitry is not required. Wireless terminal may also include an interface (such as a user interface) coupled with processing circuitry 1403, and/or wireless terminal may be incorporated in a vehicle.

As discussed herein, operations of wireless terminal 1400 may be performed by processing circuitry 1403 and/or transceiver circuitry 1401. For example, processing circuitry 1403 may control transceiver circuitry 1401 to transmit communications through transceiver circuitry 1401 over a radio interface to a radio access network node (also referred to as a base station) and/or to receive communications through transceiver circuitry 1401 from a RAN node over a radio interface. Moreover, modules may be stored in memory circuitry 1405, and these modules may provide instructions so that when instructions of a module are executed by processing circuitry 1403, processing circuitry 1403 performs respective operations (e.g., operations discussed below with respect to Example Embodiments relating to wireless terminals). According to some embodiments, a wireless terminal 1400 and/or an element(s)/function(s) thereof may be embodied as a virtual node/nodes and/or a virtual machine/machines.

Figure 15:
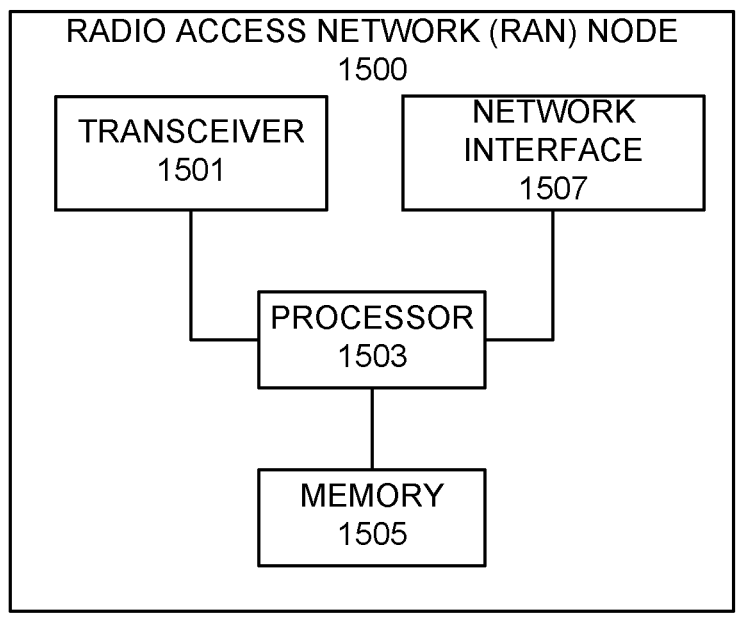
FIG. 15 is a block diagram illustrating a radio access network RAN node (e.g., a base station eNB/gNB) according to some embodiments of inventive concepts.

FIG. 15 is a block diagram illustrating elements of a radio access network RAN node 1500 (also referred to as a network node, a first network node, a second network node, a base station, eNodeB/eNB, gNodeB/gNB, etc.) of a Radio Access Network (RAN) configured to provide cellular communication according to embodiments of inventive concepts. (RAN node 1500 may be provided, for example, as discussed below with respect to network node 4160 of FIG. 21.) As shown, the RAN node may include transceiver circuitry 1501 (also referred to as a transceiver, e.g., corresponding to portions of interface 4190 of FIG. 21) including a transmitter and a receiver configured to provide uplink and downlink radio communications with mobile terminals. The RAN node may include network interface circuitry 1507 (also referred to as a network interface, e.g., corresponding to portions of interface 4190 of FIG. 21) configured to provide communications with other nodes (e.g., with other base stations) of the RAN and/or core network CN. The network node may also include processing circuitry 1503 (also referred to as a processor, e.g., corresponding to processing circuitry 4170) coupled to the transceiver circuitry, and memory circuitry 1505 (also referred to as memory, e.g., corresponding to device readable medium 4180 of FIG. 21) coupled to the processing circuitry. The memory circuitry 1505 may include computer readable program code that when executed by the processing circuitry 1503 causes the processing circuitry to perform operations according to embodiments disclosed herein. According to other embodiments, processing circuitry 1503 may be defined to include memory so that a separate memory circuitry is not required.

As discussed herein, operations of the RAN node may be performed by processing circuitry 1503, network interface 1507, and/or transceiver 1501. For example, processing circuitry 1503 may control transceiver 1501 to transmit downlink communications through transceiver 1501 over a radio interface to one or more mobile terminals UEs and/or to receive uplink communications through transceiver 1501 from one or more mobile terminals UEs over a radio interface. Similarly, processing circuitry 1503 may control network interface 1507 to transmit communications through network interface 1507 to one or more other network nodes and/or to receive communications through network interface from one or more other network nodes. Moreover, modules may be stored in memory 1505, and these modules may provide instructions so that when instructions of a module are executed by processing circuitry 1503, processing circuitry 1503 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 16:
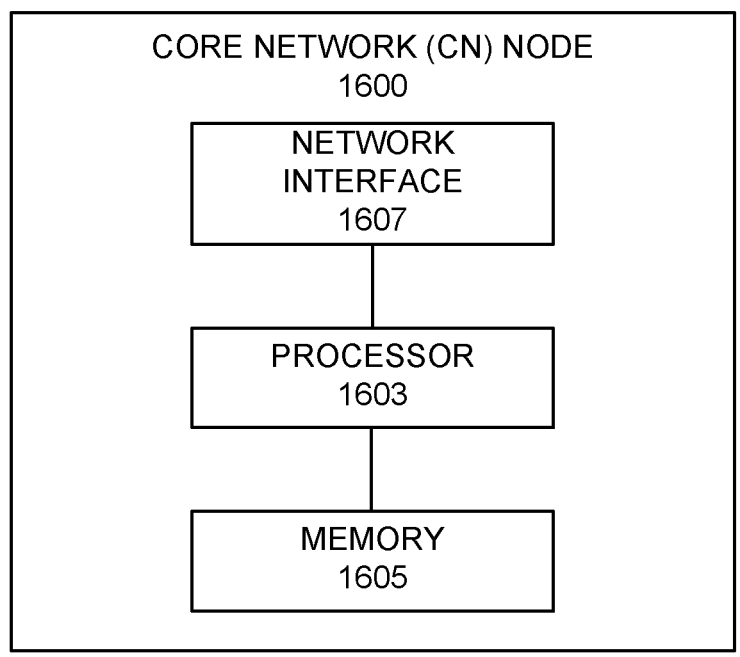
FIG. 16 is a block diagram illustrating a core network CN node (e.g., an AMF node, an SMF node, etc.) according to some embodiments of inventive concepts.

FIG. 16 is a block diagram illustrating elements of a core network CN node (e.g., an SMF node, an AMF node, etc.) of a communication network configured to provide cellular communication according to embodiments of inventive concepts. As shown, the CN node may include network interface circuitry 1607 (also referred to as a network interface) configured to provide communications with other nodes of the core network and/or the radio access network RAN. The CN node may also include a processing circuitry 1603 (also referred to as a processor) coupled to the network interface circuitry, and memory circuitry 1605 (also referred to as memory) coupled to the processing circuitry. The memory circuitry 1605 may include computer readable program code that when executed by the processing circuitry 1603 causes the processing circuitry to perform operations according to embodiments disclosed herein. According to other embodiments, processing circuitry 1603 may be defined to include memory so that a separate memory circuitry is not required.

As discussed herein, operations of the CN node may be performed by processing circuitry 1603 and/or network interface circuitry 1607. For example, processing circuitry 1603 may control network interface circuitry 1607 to transmit communications through network interface circuitry 1607 to one or more other network nodes and/or to receive communications through network interface circuitry from one or more other network nodes. Moreover, modules may be stored in memory 1605, and these modules may provide instructions so that when instructions of a module are executed by processing circuitry 1603, processing circuitry 1603 performs respective operations (e.g., operations discussed below with respect to Example Embodiments relating to core network nodes). According to some embodiments, CN node 1600 and/or an element(s)/function(s) thereof may be embodied as a virtual node/nodes and/or a virtual machine/machines.

As previously discussed, in dual connectivity, the UE can perform UL/DL transmissions/receptions towards a Master Node (MN) and/or Secondary Node (SN) (for data transmission/reception using the associated MCG and/or SCG radio links). In typical scenarios, the MCG can be considered to offer basic coverage and the SCG used to increase the data rate during data bursts. The UE needs to continuously monitor the PDCCH for uplink and downlink scheduling assignments at least on the PCell and the PSCell, and potentially all other SCells if cross carrier scheduling is not employed. Even if cross carrier scheduling is employed, the UE has to perform extra PDCCH monitoring on the PCell or the PSCell for the sake of the SCell, depending on whether the SCell belongs to the MCG or the SCG.

In order to improve network energy efficiency and UE battery life for UEs in MR-DC, a Rel-17 work item is planned to introduce efficient SCG/SCell activation/deactivation. This can be especially important for MR-DC configurations with NR SCG, as it has been evaluated in RP-190919 that in some cases NR UE power consumption is 3 to 4 times higher than LTE.

3GPP has specified the concepts of dormant SCell (in LTE) and dormancy like behavior of an SCell (for NR). However, only SCells can be put to put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution could be releasing (for power savings) and adding (when traffic demands requires) the SCG on a need basis. However, traffic is likely to be bursty, and adding and releasing the SCG involves a significant amount of RRC signaling and inter-node messaging between the MN and the SN, which causes considerable delay as previously discussed.

In rel-16, some discussions were made regarding putting also the PSCell in dormancy, also referred to as SCG Suspension. Some preliminary agreements were made in RAN2-107 bis, October 2019 (see chairman notes at R2-1914301):

R2 assumes the following (can be slightly modified due to progress on Scell dormancy):
The UE supports network-controlled suspension of the SCG in RRC_CONNECTED.
UE behavior for a suspended SCG is FFS (for further study)
The UE supports at most one SCG configuration, suspended or not suspended, in Rel16.
In RRC_CONNECTED upon addition of the SCG, the SCG can be either suspended or not suspended by configuration.

In RAN-2 108, further discussion was made to clarify the above FFSs.

Some solutions have been proposed in Rel-16, but these have different problems. For example, in R2-1908679 (Introducing suspension of SCG—Qualcomm) the paper proposes that gNB can indicate UE to suspend SCG transmissions when no data traffic is expected to be sent in SCG so that UE keeps the SCG configuration but does not use it for power saving purpose. Therein, it is mentioned that signaling to suspend SCG could be based on DCI/MAC-CE/RRC signaling, but no details were provided regarding the configuration from the gNB to the UE. And, differently from the defined behavior for SCell(s), PSCell(s) may be associated to a different network node (e.g. a gNodeB operating as Secondary Node).

One aspect addressed by the inventive concepts is that in some scenarios there can be internal conditions at a UE that is operating in MR-DC for which it could be beneficial to suspend the SCG. However, as these conditions are internal at the UE, the network that is responsible for suspending the UE is not aware of them. Similarly, there could also be internal conditions for a UE with suspended SCG, for which it can be beneficial to resume the suspended SCG. These conditions are also unknown at the network. If SCG suspension and resumption is only based on network conditions, it could lead to inefficient usage of possibly available resources or unnecessary energy/power consumption at the UE and the network.

Operations of the wireless terminal 1400 (implemented using the structure of the block diagram of FIG. 14) operating in Multi-Radio Dual Connectivity, MR-DC, and configured with a first cell group associated with a first network node and a second cell group associated with a second network node will now be discussed with reference to the flow chart of FIG. 17 according to some embodiments of inventive concepts. For example, modules may be stored in memory 1405 of FIG. 14, and these modules may provide instructions so that when the instructions of a module are executed by respective communication device processing circuitry 1403, processing circuitry 1403 performs respective operations of the flow chart.

In some embodiments, the first cell group is a Master Cell Group, MCG, comprising a primary cell, PCell, and MCG secondary cells, SCells, associated with a Master Node, MN. The second cell group in these embodiments is a Secondary Cell Group, SCG, comprising a primary secondary cell, PSCell, and SCG SCells associated with a Secondary Node, SN.

In other embodiments, the first cell group is a Secondary Cell Group, SCG, comprising a primary secondary cell (PSCell) and SCG secondary cells (SCells) associated with a Secondary Node, SN, and the second cell group is a Master Cell Group (MCG) comprising a primary cell (PCell) and MCG SCells associated with a Master Node (MN).

Figure 17:
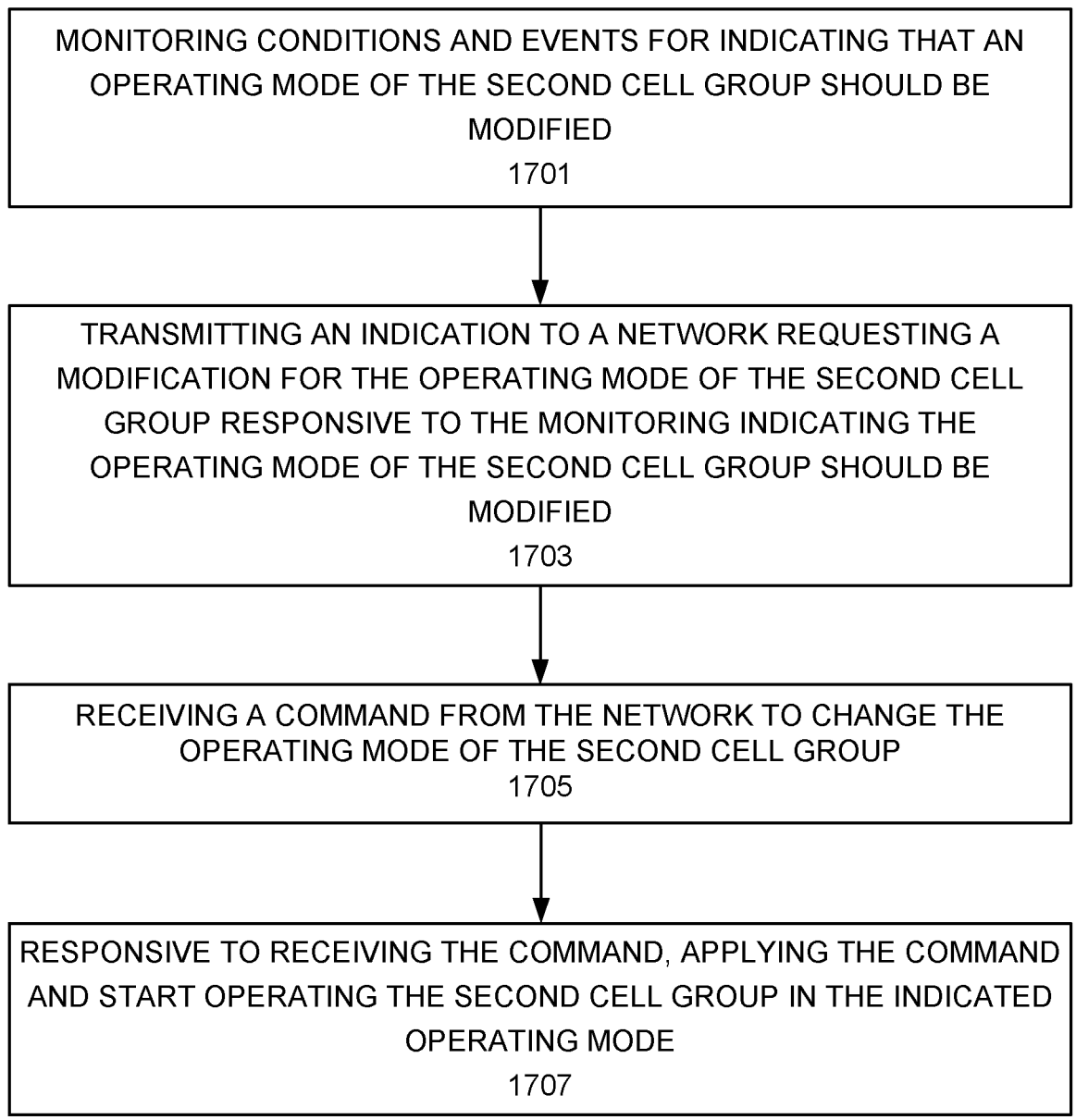
FIG. 17 is a flow chart illustrating operations of a wireless terminal according to some embodiments of inventive concepts.

Turning to FIG. 17, in block 1701, the processing circuitry 1403 monitors conditions and events for indicating that an operating mode of the second cell group should be modified. The operating mode may be one of a normal operating mode (e.g. the second cell group fully operational, no suspended radio bearers, etc.) or a reduced operating mode (such as in a power-saving mode) (e.g., suspended second cell group, dormant second cell group, deactivated second cell group, second cell group in long DRX, released SCG, etc.). Thus, the indication may be to change from a normal operating mode to the reduced operating mode or from the reduced operating mode to the normal operating mode. In other words, the operating mode of the SCG may be modified to suspend the SCG or resume operation of the SCG.

In block 1703, the processing circuitry 1403 transmits an indication to a network requesting a modification for the operating mode of the second cell group responsive to the monitoring indicating the operating mode of the second cell group should be modified.

In block 1705, the processing circuitry 1403 receives a command from the network to change the operating mode of the second cell group. In block 1701, the processing circuitry 1403, responsive to receiving the command, applies the command and start operating the second cell group in the indicated operating mode.

The conditions and events to be monitored can be one or more of the following:
UL buffer status of radio bearers (e.g. total UL buffer status, UL buffer status of specific radio bearers, UL buffer status of SN terminated bearers, UL buffer status of SCG bearers, UL buffer status of bearers of a certain QoS profile, etc.); The term UL buffer status may be interpreted as an UL data volume calculation;
Detection of incoming UL data;
UL/DL throughput (e.g. total throughput, throughput of specific radio bearers, throughput of SN terminated bearers, throughput of SCG bearers, throughput of bearers of a certain QoS profile, etc.);
UL/DL inactivity of radio bearers (e.g. no UL/DL activity of specific radio bearers, no UL/DL activity of SN terminated bearers, no UL/DL activity of SCG bearers, no UL/DL activity of bearers of a certain QoS profile, etc.);
Mobility state (e.g. low mobility state, medium mobility state, high mobility state), or estimated speed to be compared with a threshold;
level of overheating (e.g. no overheating, overheating, internal temperature level, etc.);
power/battery level (e.g. low battery level, medium battery level, high battery level);
data bulk consumption e.g. if second cell group is from a different RAT like NR, and the data bulk for NR is above a threshold.
expiry of a timer that is started when the wireless terminal receives a command to enter the operating mode, and the timer is stopped when the wireless terminal receives a command to leave the operating mode. The timer in some embodiments is configured by the network when the UE transitions to a given mode of operation e.g. suspended SCG
indication of specific type of movement e.g. rotation, elevation, etc.

The UL buffer status of radio bearers comprises a total UL buffer status of all radio bearers, or UL buffer status of a subset of radio bearers, wherein the subset of radio bearers is determined based on one or more of the following:
a PDCP termination point of radio bearers whose PDCP is terminated at the second network node;
a Cell group association comprising at least one of:
radio bearers that are associated with only the second cell group; and
radio bearers that are associated with both the first and second cell group;
a Service/Application type or QoS profile comprising at least one of radio bearers that have a specific QoS profile (5QI or CQI configuration) (e.g. bearers with a certain GBR, Guaranteed Bit Rate, URLLC bearers with strict latency requirements, etc.); and
an explicit list of radio bearer identities provided by the network The monitoring for indicating the operating mode should be modified in some embodiments includes determining that the UL buffer status (of radio bearers) remains below a first threshold (e.g., buffer_threshold_low) for a specific filtering duration (e.g. buffer_time_to_trigger). In alternative embodiments, the monitoring for indicating the operating mode in some embodiments includes determining that the UL buffer status (e.g. of the concerned radio bearers) remains above a second threshold (e.g. buffer_threshold_high) for a specific filtering duration (e.g. buffer_time_to_trigger). In these embodiments, value of the first threshold and the second threshold are common for all radio bearers whose buffer levels are being monitored. Alternatively, a value of the first threshold and the second threshold are the same for a subset of the radio bearers whose buffer levels are being monitored. In yet another alternative embodiment, each radio bearer whose buffer levels are being monitored has associated threshold values.

In other various embodiments of inventive concepts, the monitoring for indicating the operating mode should be modified includes monitoring the UL/DL throughput by monitoring one of a total UL/DL throughput of all radio bearers or the UL/DL throughput of a subset of radio bearers, where the subset of radio bearers is determined based on one or more of the following:
a PDCP termination point:
E.g. Radio bearers whose PDCP is terminated at the second node (e.g. SN terminated bearers, if the second node is a secondary node)
a cell group association comprising one of:
radio bearers that are associated with only the second cell group (e.g. SN terminated SCG bearers, or MN terminated SCG bearers); or
radio bearers that are associated with both the first cell group and the second cell group (e.g. SN terminated split bearers, MN terminated split bearers);
a service/application type or QoS profile of radio bearers that have a specific QoS profile (5QI or CQI configuration) (e.g. bearers with a certain GBR, Guaranteed Bit Rate, URLLC bearers with strict latency requirements, etc.); and
an explicit list of radio bearer Identities provided by the network.

The conditions related to UL/DL throughput of radio bearers is considered to be fulfilled (i.e., indicating that the operating mode of the SCG should be modified) when the UL/DL throughput remains below a first threshold (e.g., UL_xput_threshold_low) for a specific duration (e.g. xput_time_to_trigger). The indication sent when this happens is an indication to put the second cell group in a reduced/power-saving mode.

In an alternative embodiment, the conditions related to UL/DL throughput of radio bearers is considered to be fulfilled when the UL/DL throughput (e.g. of the concerned radio bearer(s)) stays above a second threshold (e.g., UL_xput_threshold_high) for a specific duration (e.g. xput_time_to_trigger). The indication sent when this happens is an indication to put the second cell group in a normal operating mode.

In these embodiments, a value of the first threshold (e.g., UL_xput_threshold_low) and the second threshold (e.g., UL_xput_threshold_high) are common for all radio bearers whose throughput levels are being monitored. Alternatively, each radio bearer whose throughput levels are being monitored has an associated value of the first threshold and the second threshold. In yet another alternative, values of the first threshold and the second threshold are the same for a subset of the radio bearers whose throughput levels are being monitored (e.g. same thresholds for SN terminated bearers, same thresholds for SCG bearers, same thresholds for URLLC bearers, etc.).

The detection of incoming UL data can be one or more or a combination of the following:
  arrival of UL data for a radio bearer that is suspended;
  arrival of UL data for a radio bearer whose PDCP is terminated at the second network node (e.g. SN terminated bearer, if the second node is a secondary node);
  arrival of UL data for a radio bearer that is associated with only the second cell group (e.g. SN terminated SCG bearer), while the second cell group is suspended
  arrival of UL data for a radio bearer that is associated with both the first cell group and the second cell group, where a primary path for the radio bearer is the second cell group and the second cell group is suspended; and
  arrival of UL data for radio bearers with a certain specific service or QoS profile (5QI or CQI configuration) (e.g. bearers with a certain GBR, Guaranteed Bit Rate, URLLC bearers with strict latency requirements, etc.), which is expected to be better served by the second cell group (e.g. due to the high data rate that can be provided by the second cell group).

The mobility state can be one of a low mobility state, a medium mobility state or a high mobility state; and each mobility state is associated with a range of values (e.g. low mobility state=0 to 10 km/h, medium mobility state=11 km/h to 50 km/h, etc.). The power/battery level can be one of a low battery level, a medium battery level or a high battery level; wherein each level is associated with a range of values (e.g. low battery level=0 to 15%, medium battery level=16 to 50%, etc.). The overheating conditions comprises one of no overheating, a medium level of overheating or a high over-heating level; wherein each level is associated with a range of values (e.g. of temperature).

Indicating that an operating mode of the second cell group should be modified in some embodiments is when the parameters/thresholds associated with the conditions are met. For example, the conditions to be met can be:
  when UL buffer status of all radio bearers or a sub-set of radio bearers falls below a certain threshold (e.g. buffer_threshold_low) for a certain duration (e.g. buffer_time_to_trigger); and/or
  when the UL throughput of all radio bearers or a sub-set of radio bearers falls below a certain threshold (e.g. throughput_threshold_low) for a certain duration (e.g. throughput_time_to_trigger); and/or
  when inactivity is detected for a subset of radio bearers for a certain duration (e.g. inactivity_time) (e.g. no UL/DL activity for SN terminated bearers, no UL/DL activity for SCG bearers, etc).
  when the UE enters and stays at a high mobility state for a certain duration (e.g. mobility_time_to_trigger); and/or
  when the UE battery level stays at a low level for a certain duration (e.g. battery_time_to_trigger); and/or
  when the UE detects overheating (the UE is considered to have a certain overheating level when the UE's overheating level remains within the corresponding overheating level range for certain specified duration (e.g. overheating_time_to_trigger));
  etc.

The wireless terminal in some embodiments of inventive concepts is configured by the first network node or the second network node to which conditions to monitor, along with associated criteria, thresholds and timers (e.g. concerned radio bearers or radio bearer types, time to triggers, buffer/throughput thresholds, etc.). In some embodiments, the wireless terminal is configured with different triggering conditions/thresholds corresponding with each operating mode of the second cell group (e.g. UL buffer threshold >x for threshold_time_to_trigger ☐ conditions to operate the second cell group in normal mode are fulfilled; UL buffer threshold <x for threshold_time_to_trigger ☐ conditions to operate the second cell group in power-saving mode are fulfilled).

In some embodiments, at least some different conditions are monitored together, and the wireless terminal transmits the indication to the network requesting the change of the operating mode of the second cell group if all of the conditions indicate the operating mode should be modified (e.g. UL buffer threshold >x AND mobility state is low AND power level is high, etc.).

In other embodiments, different conditions are monitored independently, and the wireless terminal considers transmitting the indication to the network requesting the change of the operating mode of the second cell group if any of the different conditions indicate the operating mode should be modified (e.g. UL buffer threshold <x OR mobility state becomes high OR power level becomes low, etc).

In various embodiments of inventive concepts, monitoring the conditions includes monitoring the conditions for operating the second cell group in power saving mode while the second cell group is currently operating in normal mode and monitoring the conditions for operating the second cell group in normal mode while the second cell group is currently operating in power saving mode.

In some embodiments, transmitting the indication to the network comprises transmitting a UE Assistance Information message that includes one or more of the following:
  a desired operating mode of the second cell group (e.g., to put the second cell group in a reduced/power saving mode or put the second cell group in a normal operating mode);
  an indication of a reason/cause for requesting the modification (e.g. UL buffer threshold of a radio bearer or a group of radio bearers is above a certain threshold);
  a buffer status report (e.g. concerning SCG bearers);
  cell and/or beam level measurements (e.g. RSRP/RSRQ/SINR) associated with the second cell group (e.g. PSCell, neighbor cells in the same frequency as the PSCell, SCG SCells, neighbor cells in the same frequency as the SCG SCells, etc.); and
  cell and/or beam level measurements (e.g. RSRP/RSRQ/SINR) associated with the first cell group (e.g. PCell, neighbor cells in same frequency as the PCell, MCG SCells, neighbor cells in the same frequency as the MCG SCells, etc.).

In other embodiments, transmitting the indication to the network comprises transmitting a radio recourse control, RRC, Resume Request message that includes one or more of the following:

- a desired operating mode of the second cell group (e.g., to put the second cell group in a reduced/power saving mode or put the second cell group in a normal operating mode);
- an indication of a reason/cause for requesting the modification (e.g. UL buffer threshold of a radio bearer or a group of radio bearers is above a certain threshold);
- a buffer status report (e.g. concerning SCG bearers);
- cell and/or beam level measurements (e.g. RSRP/RSRQ/SINR) associated with the second cell group (e.g. PSCell, neighbor cells in the same frequency as the PSCell, SCG SCells, neighbor cells in the same frequency as the SCG SCells, etc.); and
- cell and/or beam level measurements (e.g. RSRP/RSRQ/SINR) associated with the first cell group (e.g. PCell, neighbor cells in same frequency as the PCell, MCG SCells, neighbor cells in the same frequency as the MCG SCells, etc.).

In some embodiments, the indication is transmitted to the first network node. In other embodiments, the indication is transmitted to the second network node.

In various embodiments, the command to change the operating mode of the second cell group is received from the first network node. In other various embodiments, the command to change the operating mode of the second cell group is received from the second network node. The command to change the operating mode of the second cell group contains additional configuration regarding the second cell group, which is applied on top of a current second cell group configuration stored/used at the wireless terminal (i.e. delta configuration) or replaces a current second cell group configuration (i.e. a full configuration).

The first network node and the second network node in some embodiment are operating in the same radio access technology (RAT) (e.g. both are LTE nodes, both are NR nodes, etc.). In other embodiments, the first network node and the second network node are operating in different RATs (e.g. first node is an LTE node while the second node is an NR node, or vice versa).

Operations of a first network node 1500 (implemented using the structure of FIG. 15) serving a wireless terminal (1400) configured with Multi-Radio Dual Connectivity, MR-DC, and configured with a first cell group and a second cell group will now be discussed with reference to the flow chart of FIG. 18 according to some embodiments of inventive concepts. For example, modules may be stored in memory 1505 of FIG. 15, and these modules may provide instructions so that when the instructions of a module are executed by respective first network node processing circuitry 1503, processing circuitry 1503 performs respective operations of the flow chart.

Figure 18:
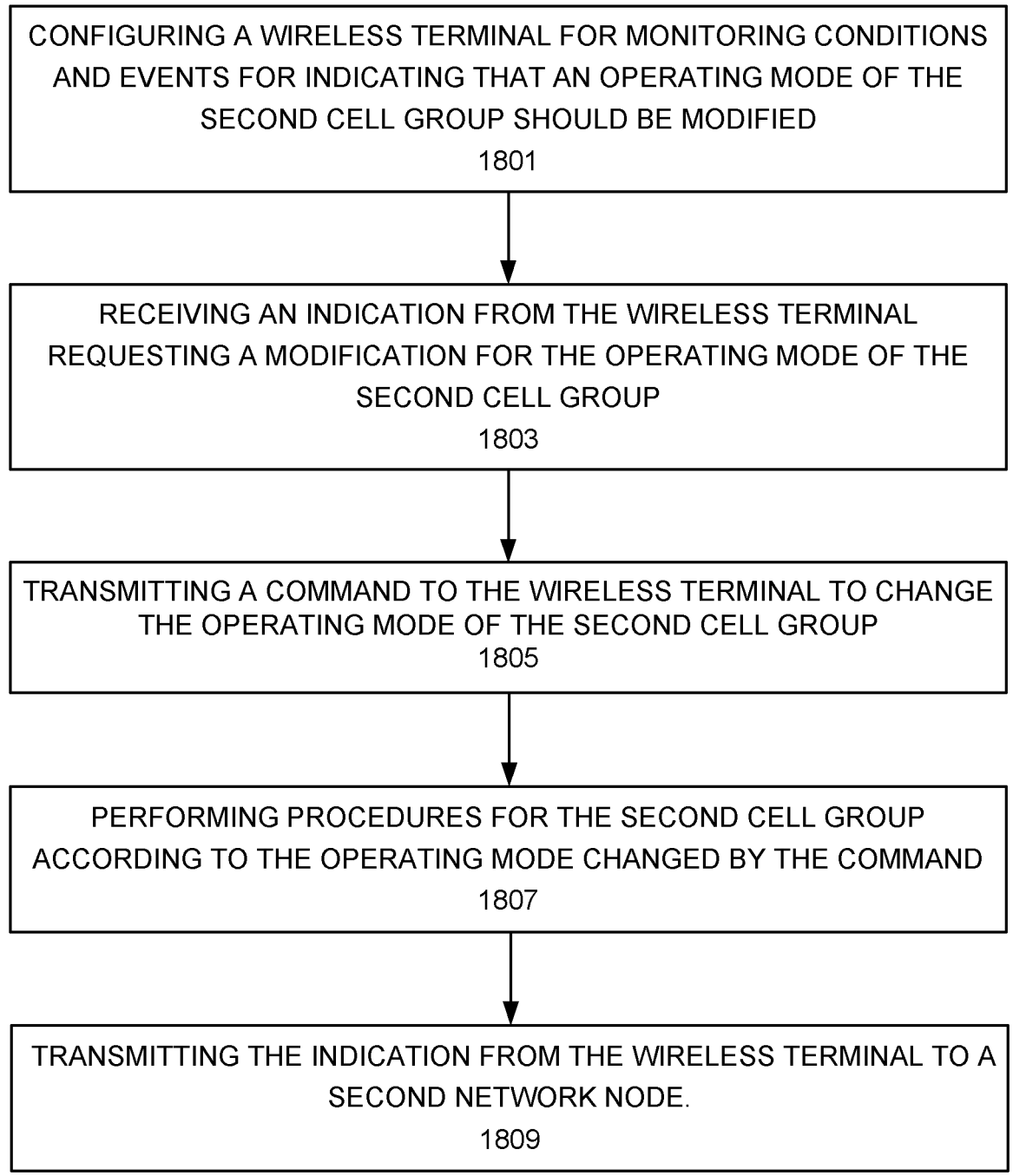
FIG. 18 is a flow chart illustrating operations of a first network node according to some embodiments of inventive concepts.

Turning now to FIG. 18, in block 1801, the processing circuitry 1503 can configure the wireless terminal (1400) with monitoring conditions/events for forwarding the indication received from the wireless terminal (1400). The monitoring conditions/events are described above.

In block 1803, the processing circuitry 1503 receives, from the wireless terminal, an indication requesting a modification for an operating mode of the second cell group. The indication has been described above.

In block 1805, the processing circuitry 1503 transmits a command to the wireless terminal to change the operating mode of the second cell group. The command may be a command to change the operating mode from the normal operating mode to the reduced/power saving mode or a command to change the operating mode from the reduced/power saving mode to the normal operating mode.

In block 1807, the processing circuitry 1503 performs procedures for the second cell group according to the operating mode changed by the command. In block 1809, the processing circuitry 1503 transmits the indication received from the wireless terminal 1400 to a second network node. For example, the second network node could be the network node that configured the wireless terminal 1400.

The first network node 1500 in various embodiments is a master node, MN, associated with the first cell group. In various embodiments, the first network node 1500 is a secondary Node, SN, associated with the second cell group.

Various operations from the flow chart of FIG. 18 may be optional with respect to some embodiments of RAN nodes and related methods. Regarding methods of example embodiment 46 (set forth below), for example, operations of blocks 1801 and 1809 of FIG. 18 may be optional.

With the embodiments described herein, the operating mode of the SCG can be changed on a need basis considering the current internal conditions at a UE (e.g. UL buffer status, arrival of UL data for a suspended bearer, UE battery level, mobility state, overheating level, etc.), instead of just relying on conditions that can be monitored at the network (e.g. DL buffer status).

If conditions at the UE were not considered and the operating mode of the SCG was decided based only on conditions (that can be monitored) at the network, suboptimal operation/performance could result. For example, the network may decide to resume a suspended PSCell that is operating at a very high frequency based only on DL buffer status, and that may result in the UE running out of battery, if the UE had low battery level at the moment when the command to activate the PSCell was received (as operating at high frequency in active mode may require considerable battery power). With the UE giving assistance information and preferred SCG state, the network could make a more informed decision that considers the conditions both at the network and the UE.

In the various embodiments of inventive concepts described above, the UE performs the monitoring conditions/events for indication that the modification of the operating mode of the second cell group should be modified, which can be interpreted as if the event indicates that modifying the operating mode of the second cell group cell is a suggestion or preference. An alternative to that is that the UE performs the monitoring conditions/events for indication that the modification of the operating mode of the second cell group needs to be modified, which can be interpreted as if the event indicates that modifying the operating mode of the second cell group cell is required i.e. needed for the normal functioning of the UE.

Suspension

Figure 19:
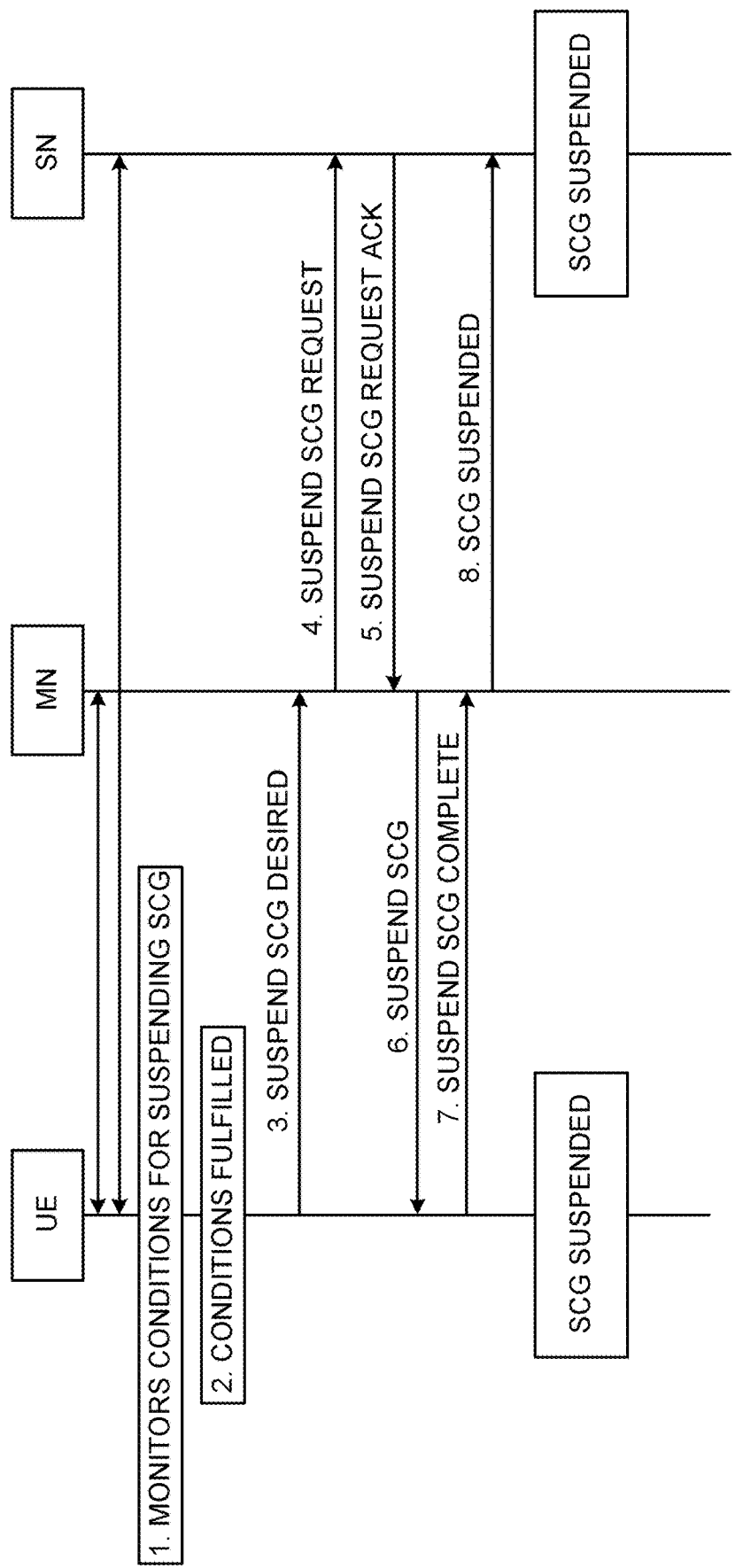
FIG. 19 is a signaling diagram for UE triggered SCG suspension according to some embodiments of inventive concepts.

Turning to FIG. 19, in one set of embodiments of inventive concepts, the wireless terminal (i.e., the UE illustrated in FIG. 19) requests to the network (e.g. MN) that the SCG configured at UE operating in MR-DC is to be suspended. The UE is configured to monitor a set of conditions/events (in operation 1), and on the fulfillment of one or more these conditions/events (operation 2), will send the request in operation 3 to the network to suspend the SCG. In one option, that is a step where the UE determines the modification and informs the network. In another option, the request for modification is a suggestion or indication of preference from the UE.

In operation 4, the MN sends a suspend SCG request to the SN, which returns an acknowledgement back to the MN in operation 5.

In operation 6, the MN sends a Suspend SCG to the wireless terminal. The wireless terminal suspends the SCG at the wireless terminal and sends a Suspend SCG complete message to the MN in operation 7. The MN sends the SCG suspended message to the SN in operation 8.

The conditions to be monitored comprise one or more of the following:
- UL buffer status of radio bearers (e.g. total UL buffer status, UL buffer status of specific radio bearers, UL buffer status of SN terminated bearers, UL buffer status of SCG bearers, UL buffer status of bearers of a certain QoS profile, etc); The term UL buffer status may be interpreted as an UL data volume calculation.
- UL/DL throughput (e.g. total throughput, throughput of specific radio bearers, throughput of SN terminated bearers, throughput of SCG bearers, throughput of bearers of a certain QoS profile, etc);
- UL/DL inactivity of radio bearers (e.g. no UL/DL activity of specific radio bearers, no UL/DL activity of SN terminated bearers, no UL/DL activity of SCG bearers, no UL/DL activity of bearers of a certain QoS profile, etc)
- Mobility state (e.g. low mobility state, medium mobility state, high mobility state), or estimated speed to be compared with a threshold;
- level of overheating (e.g. no overheating, overheating, internal temperature level, etc);
- power/battery level (e.g. low battery level, medium battery level, high battery level);
- data bulk consumption e.g. if second cell group is from a different RAT like NR, and the data bulk for NR is above a threshold.
- indication of specific type of movement e.g. rotation, elevation, etc.

The conditions are considered to be fulfilled by the UE when the parameters/thresholds associated with the conditions are met. For example:
- when UL buffer status of all radio bearers or a sub-set of radio bearers falls below a certain threshold (e.g. buffer_threshold_low) for a certain duration (e.g. buffer_time_to_trigger); and/or
- when the UL throughput of all radio bearers or a sub-set of radio bearers falls below a certain threshold (e.g. throughput_threshold_low) for a certain duration (e.g. throughput_time_to_trigger); and/or
- when inactivity is detected for a subset of radio bearers for a certain duration (e.g. inactivity_time) (e.g. no UL/DL activity for SN terminated bearers, no UL/DL activity for SCG bearers, etc).
- when the UE enters and stays at a high mobility state for a certain duration (e.g. mobility_time_to_trigger); and/or
- when the UE battery level stays at a low level for a certain duration (e.g. battery_time_to_trigger); and/or
- when the UE detects overheating;
- etc.

In one embodiment, the UE requests the suspension of the SCG using RRC message (e.g. a UE Assistance information like message).

In one embodiment, the UE requests the suspension of the SCG using a MAC control element (MAC CE).

Resumption

Figure 20:
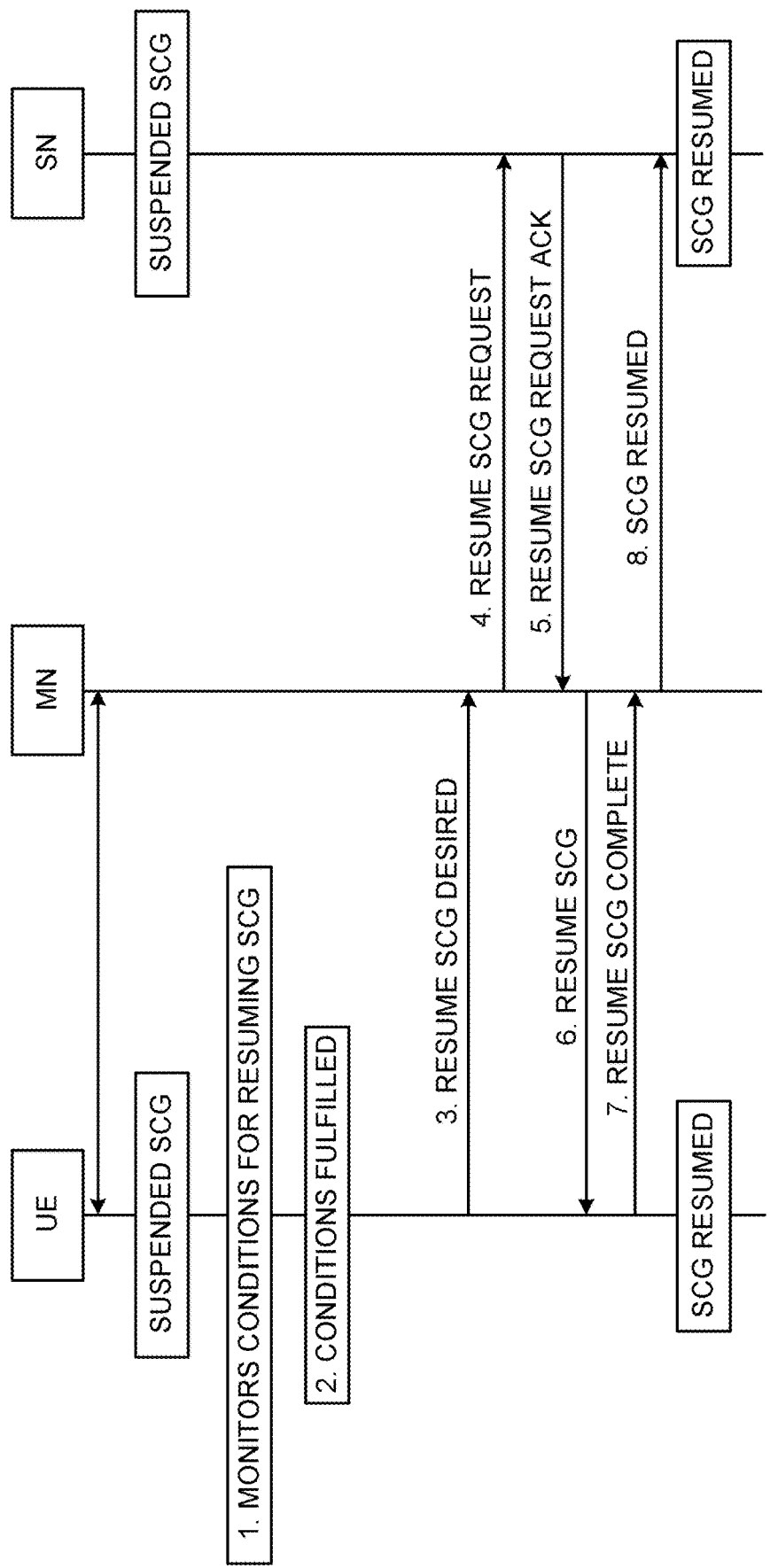
FIG. 20 is a signaling diagram for UE triggered SCG resumption according to some embodiments of inventive concepts.

Turning to FIG. 20, In one set of embodiments, it is the UE that determines (or requests to the network e.g. MN) that a currently suspended SCG is to be resumed. The UE is configured to monitor a set of conditions/events while the SCG is suspended in operation 1, and on the fulfillment of one or more these conditions/events as illustrated by operation 2, will send the request to the network to resume the SCG in operation 3 as illustrated by the Resume SCG Desired signaling. In one option, operation 3 is a step where the UE determines the modification and informs the network. In another option, the request for modification is a suggestion or indication of preference from the UE.

In operation 4, the MN sends a Resume SCG request to the SN, which returns an acknowledgement (Resume SCG Request ACK) back to the MN in operation 5.

In operation 6, the MN sends a Resume SCG to the wireless terminal. The wireless terminal resumes the SCG at the wireless terminal and sends a Resume SCG complete message to the MN in operation 7. The MN sends the SCG resumed message to the SN in operation 8.

The conditions to be monitored comprise one or more of the following:
- Arrival of UL data of certain radio bearers (e.g. UL data arrival for an SCG bearer, UL data arrival for an SN terminated bearer, UL data arrival for a radio bearer with a specific radio bearer id, etc);
- UL buffer status of radio bearers (e.g. total UL buffer status, UL buffer status of specific radio bearers, UL buffer status of SN terminated bearers, UL buffer status of SCG bearers, UL buffer status of bearers of a certain QoS profile, etc);
- UL/DL throughput (e.g. total throughput, throughput of specific radio bearers, throughput of SN terminated bearers, throughput of SCG bearers, throughput of bearers of a certain QoS profile, etc);
- Mobility state (e.g. low mobility state, medium mobility state, high mobility state);
- level of overheating (e.g. no overheating, overheating);
- power/battery level (e.g. low battery level, medium battery level, high battery level);
- monitoring of a timer (possibly configured by the network when the UE transitions to a given mode of operation e.g. suspended SCG);
  In this case, the timer is started when the UE receives a command to enter the mode of operation, and the timer is stopped (if running), when the UE receives a command to leave the mode of operation;
- indication associated to data bulk consumption e.g. if second cell group is from a different RAT like NR, and the data bulk for NR is renewed at the end of a time duration, like the end of the month where subscription bulk is renewed.

The conditions are considered to be fulfilled by the UE when the parameters/thresholds associated with the conditions are met. For example:
- when UL buffer status of all radio bearers or a sub-set of radio bearers becomes larger than a certain threshold (e.g. buffer_threshold_high) for a certain duration (e.g. buffer_time_to_trigger); and/or
- when the UL throughput of all radio bearers or a sub-set of radio bearers becomes larger than a certain threshold (e.g. throughput_threshold_low) for a certain duration (e.g. throughput_time_to_trigger); and/or
- when UL data arrives that corresponds to a certain radio bearer or sub-set of radio bearers (e.g. UL data arrival for an SCG bearer, UL data arrival for SN terminated bearers, etc.)

when the UE enters and stays at a low mobility state for a certain duration (e.g. mobility_time_to_trigger); and/or when the UE battery level stays at a high level for a certain duration (e.g. battery_time_to_trigger); and/or when the UE detects that it is not experiencing overheating anymore;

expiry of a timer (possibly configured by the network when the UE transitions to a given mode of operation e.g. suspended SCG);

In this case, the timer is started when the UE receives a command to enter the mode of operation, and the timer is stopped (if running), when the UE receives a command to leave the mode of operation;

The timer could control for how long the SN-related/SCG-related UE AS context is to be stored without a notification from the UE. That can be used to prevent the network to store a SN-related/SCG-related UE AS Context for too long.

etc.

In one embodiment, the UE requests the resumption of the SCG using an RRC message (e.g. UE Assistance information like message, RRC Resume like message)

In one embodiment, the UE requests the resumption of the SCG using a MAC control element (MAC CE).

Further Details

In the message/indication/request sent to the network, in addition to the desired operating mode of the second cell group, the wireless terminal may include additional information about current conditions at the wireless terminal.

The wireless terminal may include information about the condition(s) that triggered the request (e.g. UL buffer threshold of a radio bearer or a group of radio bearers is above a certain threshold, wireless terminal battery power at a certain level, etc.)

The wireless terminal may include information associated to the BSR or the content of the BSR itself (e.g. concerning SCG bearers). This could be a legacy BSR that is at a granularity of logical channel groups (LCGs), or it could be an enhanced BSR that is at an LCID level (e.g. corresponding to each SCG radio bearer that is suspended). It should be noted that in legacy PDCP/MAC, the wireless terminal sends the BSR corresponding to SCG-only bearers and split bearers that have primary path as the SCG while the UL buffer is less than the corresponding UL buffer split threshold, only to the SN (i.e. PDCP data volume calculation sent to SCG MAC, and BSR CE sent to the SN from the SCG MAC). In the methods described herein, if the SCG was suspended, and data arrival is detected to an SCG-only bearer or/and split bearer with the primary path set to SCG, the wireless terminal may trigger the request to resume the SCG (including the BSR of the concerned bearers) to the MN (i.e. BSR CE sent from the MCG MAC instead).

The wireless terminal may include measurements (cell and/or beam level measurements, e.g. RSRP/RSRQ/SINR) associated with the second cell group e.g. PSCell, neighbor cells in the same frequency as the PSCell, SCG SCells, neighbor cells in the same frequency as the SCG SCells, etc; as well as cell and/or beam level measurements (e.g. RSRP/RSRQ/SINR) associated with the first cell group e.g. PCell, neighbor cells in same frequency as the PCell, MCG SCells, neighbor cells in the same frequency as the MCG SCells, etc.

In another embodiment, the wireless terminal will not trigger the request under certain measurement conditions. In other words, the wireless terminal monitors a condition, which may be combined as an AND or OR logic with any of the previous conditions described, wherein at least one of the conditions is associated to measurements the wireless terminal performs (e.g. PSCell RSRP, RSRQ, SINR). For example:

if the SCG is suspended, the wireless terminal triggers the request to resume the SCG, only if the signal level/quality (e.g. RSRP, RSRQ, SINR, or combinations of these like RSRP and RSRQ) with the suspended PSCell is above a certain threshold; Notice that in this example one could possibly assume the network does not configure measurement reports for the PSCell, e.g., based on events A4 (PSCell measurement quantity above threshold), but rather rely on the indication from the network that includes other conditions, which may also reduce the load and save power at the wireless terminal (as only a single indication/report is sent, when multiple conditions are fulfilled to indicate the preference to resume);

if the SCG is in normal operation, the wireless terminal triggers the request to suspend the SCG, only if the signal level/quality (e.g. RSRP, RSRQ, SINR, or combinations of these like RSRP and RSRQ) with the PSCell is above a certain threshold, otherwise the indication is to release the SCG instead;

if the SCG is in suspended, the wireless terminal triggers the request to resume the SCG, if the signal level/quality (e.g. RSRP, RSRQ, SINR, or combinations of these like RSRP and RSRQ) with the PSCell is above a certain threshold, even if the data volume/throughput conditions are not fulfilled.

When it comes to conditions such as power level and overheating, the wireless terminal could include additional information regarding the cell group or serving cell(s) that are significantly contributing to that problem/condition. For example, the wireless terminal may monitor the power consumption per cell group or serving cell and when it sends a request to suspend the SCG, could include the contribution of each cell group or serving cell (e.g. as a percentage value, such as PSCell usage has resulted in 80% of the battery usage). More complex/granular monitoring conditions could also be envisioned, such as the wireless terminal triggering the request to suspend the SCG suspension only if the PSCell or SCG SCells were the ones responsible for draining the wireless terminal battery or causing the overheating.

When it comes to conditions related to BSR or uplink data volume, to be used according to the method, that could be calculated in different ways, e.g., in different protocol layers.

In one embodiment, UL data volume can be calculated at the PDCP layer at the wireless terminal. In other words, data volume corresponds to a PDCP data volume, for example the calculated amount of data in the wireless terminal's UL data buffers (i.e. PDCP/RLC buffers) represented as a numerical value, such as number of octets. In that case, the wireless terminal's transmitting PDCP entity (i.e. handling UL transmissions) shall consider the following as PDCP data volume:

the PDCP SDUs for which no PDCP Data PDUs have been constructed;

the PDCP Data PDUs that have not been submitted to lower layers;

the PDCP Control PDUs;

for AM DRBs, the PDCP SDUs to be retransmitted;

for AM DRBs, the PDCP Data PDUs to be retransmitted.

In a first option, the PDCP layer is the PDCP entities associated to the SN (e.g. the PDCP entities for SN terminated bearers or/and SCG bearers). In other words, data volume is only calculated for SN-terminated bearers and/or SCG bearers. In a second option, the PDCP layer is the PDCP layer associated to one or more specific bearers (e.g. indicated to the wireless terminal).

In one embodiment, the indication from the wireless terminal to the network for modification of the second cell group mode of operation is triggered by the fulfillment of a condition, that can be a comparison between the calculated data volume and a configured data volume threshold. In one alternative, that threshold is configured by the network for that purpose (e.g. as part of the SCG configuration).

In another embodiment, the wireless terminal uses as input for the condition a filtered version of the calculated data volume (with a filter coefficient a, or parameters to derive it, being configurable), such as the following filtered version of the Data Volume e.g. to be compared with a data volume threshold:

$$\text{Filtered Data Volume}(n) = (a-1)*\text{Filtered Data Volume}(n-1) + a*\text{Calculated Data Volume}(n)$$

By doing this, the condition filters away peaks in the traffic demands. For example, if the condition is set by the network so that the wireless terminal sends the request to resume the SCG based on increase of traffic demand, a non-filtered data volume compared with a threshold would lead to an SCG resumption due to a temporary peak immediately followed by low traffic demands. Hence, it is beneficial to have a filtered version so that the condition is only considered as fulfilled if there is persistency in the increase of traffic demand before the condition is considered as fulfilled.

In another embodiment, a time to trigger (TTT) is introduced for the data volume (e.g. filtered version, non-filtered version), e.g., dataVolume-TTT. The wireless terminal uses the data volume TTT to consider the condition as fulfilled when the data volume calculated (filtered or unfiltered) fulfills the condition (e.g. data volume above a threshold or below a threshold) for a time duration of a TTT. The usage of a data volume TTT avoids the wireless terminal to consider the condition as fulfilled due to short peaks in traffic demands and/or short drops.

Filtered calculation of data volume/throughput and associated time to trigger can be employed together to have a finer control when to decide to consider the conditions are fulfilled.

Example Signaling/Procedures

Two examples of possible IEs that can be included in the UE Assistance information for requesting to suspension/resumption of the SCG are shown below:

Example a) same IE as in the RRC state case is reused for the new field e.g. releasePreferenceSCG; if the wireless terminal indicates 'idle' it means the wireless terminal wants the release of the SCG, if the wireless terminal indicates 'inactive' it means the wireless terminal wants the suspension of the SCG, if the wireless terminal indicates 'connected' it means the wireless terminal wants to remain with the active or, if the SCG is suspended, the wireless terminal wants to resume the SCG;

```
UEAssistanceInformation-v16xy-IEs ::= SEQUENCE {
    ...
    releasePreference-r16        ReleasePreference-r16   OPTIONAL,
    releasePreferenceSCG-r17         ReleasePreference-r16   OPTIONAL,
    ...
}
ReleasePreference-r16 ::=    SEQUENCE {
    preferredRRC-State-r16          ENUMERATED {idle, inactive, connected} OPTIONAL
}
```

Example b) a new IE (e.g.) is defined for the new field e.g. releasePreferenceSCG; if the UE indicates 'releaseSCG' it means the UE wants the release of the SCG, if the UE indicates 'suspendSCG' it means the UE wants the suspension of the SCG, if the UE indicates 'connected' it means the UE wants to remain with the active or, if the SCG is suspended, the UE wants to resume the SCG;

```
UEAssistanceInformation-v16xy-IEs ::= SEQUENCE {
    ...
    releasePreference-r16        ReleasePreference-r16           OPTIONAL,
    releasePreferenceSCG-r17         ReleasePreference-r17           OPTIONAL,
    ...
}
ReleasePreference-r16 ::=    SEQUENCE {
    preferredRRC-State-r16          ENUMERATED {idle, inactive, connected} OPTIONAL
}
ReleasePreference-r17 ::=    SEQUENCE {
    preferredSCG-State-r17          ENUMERATED {releaseSCG, suspendSCG, dormantSCG,
    storedSCG, longDRX, connected} OPTIONAL
}
```

A UE capable of providing assistance information to transition the SCG to suspended may initiate the procedure if it was configured to do so, upon determining that it prefers to transition to stored SCG, or upon change of its preferred SCG state (e.g. from stored to resumed, or from preference to stored SCG to connected/active SCG).

In one option a timer is defined to control the transmission of preferences concerning the preferred SCG state at the UE (e.g. T346f-scg);

One example is shown below for the UE procedure concerning the report of its preference of SCG state (e.g. stored SCG, resumed SCG):

The UE Shall:
1> if configured to provide its release preference for the SCG:
  2> if the UE determines that it would prefer to transition to stored SCG and the UE did not transmit a UEAssistanceInformation message with releasePreferenceSCG since it was configured to provide its release preference; or
  2> if the current preferred state for the SCG is different from the one indicated in the last transmission of the UEAssistanceInformation message including releasePreferenceSCG and timer T346f-scg is not running:
    3> start timer T346f-SCG with the timer value set to the releasePreferenceSCGProhibitTimer;
    3> initiate transmission of the UEAssistanceInformation message in accordance with 5.7.4.3 as defined in TS 38.331 to provide the release preference;
. . .

5.7.4.3 Actions Related to Transmission of UEAssistanceInformation Message

The UE shall set the contents of the UEAssistanceInformation message as follows:
. . .
1> if transmission of the UEAssistanceInformation message is initiated to provide a release preference (or state change of SCG) for the SCG according to 5.7.4.2:
  2> include releasePreferenceSCG in the UEAssistanceInformation message;
  2> if the UE has a preferred SCG state on transmission of the UEAssistanceInformation message:
    3> include preferredSCG-State in the ReleasePreference IE;
    3> set preferredSCG-State to the desired RRC state on transmission of the UEAssistanceInformation message.

The UE shall submit the UEAssistanceInformation message to lower layers for transmission.

Examples for Resume Request Like Message

The message can include a wireless terminal identifier for the UE AS Context associated with the SN, such as the C-RNTI of the PSCell before the SCG got suspended, the C-RNTI of the MCG, one I-RNTI(s) possibly provided for a wireless terminal in RRC_CONNECTED, or another identifier.

In one alternative, an RRC Resume Request message does not need to include an indication indicating the network that this is a request to resume the SCG, but that is determined implicitly by the network upon identifying the request is done by a wireless terminal that is already in RRC_CONNECTED and has its SCG suspended.

The ResumeRequest like message may contain additional information such as a cause value (e.g. UL buffer threshold of a radio bearer or a group of radio bearers is above a certain threshold) and even detailed information such as the exact SCG bearer(s) that were responsible for the wireless terminal to trigger the request, buffer status reports of the concerned bearers, etc.;

The ResumeRequest like message can be sent to the MN or directly to the SN

Example embodiments are discussed below.

Embodiment 1. A method performed by a wireless terminal (1400) operating in Multi-Radio Dual Connectivity, MR-DC, and configured with a first cell group associated with a first network node and a second cell group associated with a second network node, the method comprising:
  monitoring (1701) conditions and events for indicating that an operating mode of the second cell group should be modified;
  transmitting (1703) an indication to a network requesting a modification for the operating mode of the second cell group responsive to the monitoring indicating the operating mode of the second cell group should be modified;
  receiving (1705) a command from the network to change the operating mode of the second cell group; and responsive to receiving the command, applying (1707) the command and start operating the second cell group in the indicated operating mode.

Embodiment 2. The method according to Embodiment 1, wherein the first cell group is a Master Cell Group, MCG, comprising a primary cell, PCell, and MCG secondary cells, SCells, associated with a Master Node, MN, and the second cell group is a Secondary Cell Group, SCG, comprising a primary secondary cell, PSCell, and SCG SCells associated with a Secondary Node, SN.

Embodiment 3. The method according to Embodiment 1, wherein the first cell group is a Secondary Cell Group, SCG, comprising a primary secondary cell, PSCell, and SCG secondary cells, SCells, associated with a Secondary Node, SN, and the second cell group is a Master Cell Group, MCG, comprising a primary cell, PCell, and MCG SCells associated with a Master Node, MN.

Embodiment 4. The method according to Embodiment 1, wherein the operating mode of the second cell group comprises one of a normal operating mode or a reduced/power-saving mode.

Embodiment 5. The method according to Embodiment 1, wherein the conditions and the events that are monitored comprise one or more of the following:
  UL buffer status of radio bearers;
  detection of incoming UL data;
  UL/DL throughput;
  Mobility state;
  information related to temperature including overheating conditions;
  power/battery level;
  expiry of a timer that is started when the wireless terminal receives a command to enter the operating mode, and the timer is stopped when the wireless terminal receives a command to leave the operating mode;
  an indication associated to data bulk consumption; and
  an indication of a specified type of movement Embodiment 6. The method according to Embodiment 5, wherein the UL buffer status of radio bearers comprises a total UL buffer status of all radio bearers, or UL buffer status of a subset of radio bearers, wherein the subset of radio bearers is determined based on one or more of the following:
  a PDCP termination point of radio bearers whose PDCP is terminated at the second network node;

a Cell group association comprising at least one of:
  radio bearers that are associated with only the second cell group; and
  radio bearers that are associated with both the first and second cell group;
a Service/Application type or QoS profile comprising at least one of radio bearers that have a specific QoS profile; and
an explicit list of radio bearer identities provided by the network.

Embodiment 7. The method according to Embodiment 6, wherein the monitoring for indicating the operating mode of the second cell group should be modified comprises determining that the UL buffer status remains below a first threshold for a specific filtering duration.

Embodiment 8. The method according to Embodiment 7, where the indication transmitted to the network comprises an indication to put the second cell group in a reduced/power-saving mode.

Embodiment 9. The method according to Embodiment 6, wherein the monitoring for indicating the operating mode of the second cell group should be modified comprises determining that the UL buffer status stays above a second threshold for a specific filtering duration.

Embodiment 10. The method according to Embodiment 9, where the indication transmitted to the network is an indication to put the second cell group in a normal operating mode.

Embodiment 11. The method according to any of Embodiments 7 and 9, wherein a value of the first threshold and the second threshold are common for all radio bearers whose buffer levels are being monitored.

Embodiment 12. The method according to any of Embodiments 7 and 9, wherein each radio bearer whose buffer levels are being monitored has associated threshold values.

Embodiment 13. The method according to any of Embodiments 7 and 9, wherein a value of the first threshold and the second threshold are the same for a subset of the radio bearers whose buffer levels are being monitored.

Embodiment 14. The method according to Embodiment 5, wherein the detection of incoming UL data comprises one or more or a combination of the following:
  arrival of UL data for a radio bearer that is suspended;
  arrival of UL data for a radio bearer whose PDCP is terminated at the second network node;
  arrival of UL data for a radio bearer that is associated with only the second cell group, while the second cell group is suspended
  arrival of UL data for a radio bearer that is associated with both the first cell group and the second cell group, where a primary path for the radio bearer is the second cell group and the second cell group is suspended; and
  arrival of UL data for radio bearers with a certain specific service or QoS profile which is expected to be better served by the second cell group.

Embodiment 15. The method according to Embodiment 5, wherein the UL/DL throughput comprises one of a total UL/DL throughput of all radio bearers or the UL/DL throughput of a subset of radio bearers, where the subset of radio bearers is determined based on one or more of the following:
  a PDCP termination point:
  a cell group association comprising one of:
    radio bearers that are associated with only the second cell group; or
    radio bearers that are associated with both the first cell group and the second cell group;
  a service/application type or QoS profile of radio bearers that have a specific QoS profile; and
  an explicit list of radio bearer Identities provided by the network.

Embodiment 16. The method according to Embodiment 15, wherein the conditions related to UL/DL throughput of radio bearers is considered to be fulfilled when the UL/DL throughput remains below a first threshold for a specific duration.

Embodiment 17. The method according to Embodiment 16, where the indication sent to the network is an indication to put the second cell group in a reduced/power-saving mode.

Embodiment 18. The method according to Embodiment 15, wherein the conditions related to UL/DL throughput of radio bearers is considered to be fulfilled when the UL/DL throughput stays above a second threshold for a specific duration.

Embodiment 19. The method according to Embodiment 17, where the indication sent to the network is an indication to put the second cell group in a normal operating mode.

Embodiment 20. The method according to Embodiments 16 and 18, wherein a value of the first threshold and the second threshold are common for all radio bearers whose throughput levels are being monitored.

Embodiment 21. The method according to Embodiments 16 and 18, wherein each radio bearer whose throughput levels are being monitored has an associated value of the first threshold and the second threshold.

Embodiment 22. The method according to Embodiments 16 and 18, wherein values of the first threshold and the second threshold are the same for a subset of the radio bearers whose throughput levels are being monitored.

Embodiment 23. The method according to Embodiment 5, wherein the mobility state comprises one of a low mobility state, a medium mobility state or a high mobility state; and each mobility state is associated with a range of values.

Embodiment 24. The method according to Embodiment 5, wherein the power/battery level comprises one of a low battery level, a medium battery level or a high battery level; wherein each level is associated with a range of values.

Embodiment 25. The method according to Embodiment 5, wherein the overheating conditions comprises one of no overheating, a medium level of overheating or a high over-heating level; wherein each level is associated with a range of values.

Embodiment 26. The method according to any of Embodiments 5 to 25, where the wireless terminal is configured by the first network node or the second network node to which conditions to monitor, along with associated criteria, thresholds and timers.

Embodiment 27. The method according to Embodiment 5, wherein different conditions are monitored independently, and the wireless terminal considers transmitting the indication to the network requesting the change of the operating mode of the second cell group if any of the different conditions indicate the operating mode should be modified.

Embodiment 28. The method according to Embodiment 5, wherein at least some different conditions are monitored together, and the wireless terminal transmits the indication to the network requesting the change of the operating mode of the second cell group if all of the conditions indicate the operating mode should be modified.

Embodiment 29. The method according to any of Embodiments 1-28, wherein the wireless terminal is configured with different triggering conditions/thresholds corresponding with each operating mode of the second cell group.

Embodiment 30. The method according to Embodiment 5, wherein monitoring the conditions comprises monitoring the conditions for operating the second cell group in power saving mode while the second cell group is currently operating in normal mode and monitoring the conditions for operating the second cell group in normal mode while the second cell group is currently operating in power saving mode.

Embodiment 31. The method according to Embodiment 1, wherein transmitting the indication to the network comprises transmitting a UE Assistance Information message that includes one or more of the following:
- a desired operating mode of the second cell group;
- an indication of a reason/cause for requesting the modification;
- a buffer status report;
- cell and/or beam level measurements associated with the second cell group; and cell and/or beam level measurements associated with the first cell group.

Embodiment 32. The method according to Embodiment 1, wherein transmitting the indication to the network comprises transmitting a radio recourse control, RRC, Resume Request message that includes one or more of the following:
- a desired operating mode of the second cell group;
- an indication of a reason/cause for requesting the modification;
- a buffer status report;
- cell and/or beam level measurements associated with the second cell group; and cell and/or beam level measurements associated with the first cell group.

Embodiment 33. The method according to Embodiment 1, wherein transmitting the indication comprises transmitting the indication to the first network node.

Embodiment 34. The method according to Embodiment 1, wherein transmitting the indication comprises transmitting the indication to the second network node.

Embodiment 35. The method according to Embodiment 1, wherein receiving the command to change the operating mode of the second cell group comprises receiving the command from the first network node.

Embodiment 36. The method according to Embodiment 1, wherein receiving the command to change the operating mode of the second cell group comprises receiving the command from the second network node.

Embodiment 37. The method according to Embodiment 1, wherein the command to change the operating mode of the second cell group contains additional configuration regarding the second cell group, which is applied on top of a current second cell group configuration stored/used at the wireless terminal or replaces a current second cell group configuration.

Embodiment 38. The method according to Embodiment 1, wherein the first network node and the second network node are operating in a same radio access technology (RAT).

Embodiment 39. The method according to Embodiment 1, wherein the first network node and the second network node are operating in different radio access technologies (RATs).

Embodiment 40. A wireless terminal (1400) adapted to perform operations comprising: monitoring (1701) conditions and events for indicating that an operating mode of the second cell group should be modified;
transmitting (1703) an indication to a network requesting a modification for the operating mode of the second cell group responsive to the monitoring indicating the operating mode of the second cell group should be modified;
receiving (1705) a command from the network to change the operating mode of the second cell group; and responsive to receiving the command, applying (1707) the command and start operating the second cell group in the indicated operating mode.

Embodiment 41. The wireless terminal (1400) of Embodiment 40 wherein the wireless terminal (1400) is adapted to perform operations according to any of Embodiments 2-39.

Embodiment 42. A wireless terminal (1400) comprising:
processing circuitry (1403); and memory (1405) coupled with the processing circuitry, wherein the memory includes instructions that when executed by the processing circuitry causes the wireless terminal to perform operations comprising:
monitoring (1701) conditions and events for indicating that an operating mode of the second cell group should be modified;
transmitting (1703) an indication to a network requesting a modification for the operating mode of the second cell group responsive to the monitoring indicating the operating mode of the second cell group should be modified;
receiving (1705) a command from the network to change the operating mode of the second cell group; and responsive to receiving the command, applying (1707) the command and start operating the second cell group in the indicated operating mode.

Embodiment 43. The wireless terminal (1400) of Embodiment 42, wherein the memory includes further instructions that when executed by the processing circuitry causes the wireless terminal to perform operations according to any of Embodiments 2-39.

Embodiment 44. A computer program comprising program code to be executed by processing circuitry (1403) of a wireless terminal (1400), whereby execution of the program code causes the wireless terminal (1400) to perform operations according to any of embodiments 1-39.

Embodiment 45. A computer program product comprising a non-transitory storage medium including program code to be executed by processing circuitry (1403) of a wireless terminal (1400), whereby execution of the program code causes the wireless terminal (1400) to perform operations according to any of embodiments 1-39.

Network Embodiments

Embodiment 46. A method performed by a first network node (1500) serving a wireless terminal (1400) configured with Multi-Radio Dual Connectivity, MR-DC, and configured with a first cell group and a second cell group, the method comprising:
receiving (1803), from the wireless terminal, an indication requesting a modification for an operating mode of the second cell group;
transmitting (1805) a command to the wireless terminal to change the operating mode of the second cell group; and
performing (1807) procedures for the second cell group according to the operating mode changed by the command.

Embodiment 47. The method according to Embodiment 46, wherein the first network node (1500) is a master node, MN, associated with the first cell group.

Embodiment 48. The method according to Embodiment 46, wherein the first network node (1500) is a secondary Node, SN, associated with the second cell group.

Embodiment 49. The method according to Embodiment 46, further comprising configuring (1801) the wireless terminal (1400) with monitoring conditions/events for forwarding the indication received from the wireless terminal (1400).

Embodiment 50. The method according to Embodiment 47, further comprising transmitting (1809) the indication from the wireless terminal (1400) to a second network node.

Embodiment 51. A first network node (1500) serving a wireless terminal (1400) configured with Multi-Radio Dual Connectivity, MR-DC, and configured with a first cell group and a second cell group, the first network node (1500) adapted to perform operations comprising:
  receiving (1803), from the wireless terminal, an indication requesting a modification for an operating mode of the second cell group;
  transmitting (1805) a command to the wireless terminal to change the operating mode of the second cell group; and
  performing (1807) procedures for the second cell group according to the operating mode changed by the command.

Embodiment 52. The first network node (1500) of Embodiment 51 wherein the first network node (1500) is adapted to perform operations according to any of Embodiments 47-50.

Embodiment 53. A first network node (1500) comprising:
  processing circuitry (1503); and
  memory (1505) coupled with the processing circuitry, wherein the memory includes instructions that when executed by the processing circuitry causes the first network node to perform operations comprising:
    receiving (1803), from the wireless terminal, an indication requesting a modification for an operating mode of the second cell group;
    transmitting (1805) a command to the wireless terminal to change the operating mode of the second cell group; and
    performing (1807) procedures for the second cell group according to the operating mode changed by the command.

Embodiment 54. The first network node (1500) of Embodiment 53, wherein the memory includes further instructions that when executed by the processing circuitry causes the wireless terminal to perform operations according to any of Embodiments 47-50.

Embodiment 55. A computer program comprising program code to be executed by processing circuitry (1503) of a first network node (1500), whereby execution of the program code causes the first network node (1500) to perform operations according to any of embodiments 46-50.

Embodiment 56. A computer program product comprising a non-transitory storage medium including program code to be executed by processing circuitry (1503) of a first network node (1500), whereby execution of the program code causes the first network node (1500) to perform operations according to any of embodiments 46-50.

Explanations are provided below for various abbreviations/acronyms used in the present disclosure.

| Abbreviation | Explanation |
| --- | --- |
| 5GC | 5th Generation Core network |
| CDM | Code Division Multiplex |
| CQI | Channel Quality Information |
| CRC | Cyclic Redundancy Check |
| DC | Dual Connectivity |
| DCI | Downlink Control Information |
| DFT | Discrete Fourier Transform |
| DM-RS | Demodulation Reference Signal |
| DRX | Discontinuous Reception |

-continued

| Abbreviation | Explanation |
| --- | --- |
| EPC | Evolved Packet Core network |
| FDM | Frequency Division Multiplex |
| HARQ | Hybrid Automatic Repeat Request |
| OFDM | Orthogonal Frequency Division Multiplex |
| PAPR | Peak to Average Power Ratio |
| PUCCH | Physical Uplink Control Channel |
| PUSCH | Physical Uplink Shared Channel |
| SRS | Sounding Reference Signal |
| PRACH | Physical Random Access Channel |
| DC | Dual-connectivity |
| PRB | Physical Resource Block |
| RRC | Radio Resource Control |
| UCI | Uplink Control Information |
| EIRP | Effective Isotropic Radiated Power |
| SS-block | Synchronisation Signal Block |
| CSI-RS | Channel State Information Reference Signal |
| PBCH | Primary Broadcast Channel |
| MAC | Medium Access Control |
| MAC CE | MAC Control Entity |
| MCG | Master cell group |
| MR-DC | Multi-Radio Dual Connectivity |
| SCG | Secondary cell group |
| MN | Master Node |

References are identified below.

***Insert Full Citations of References Mentioned in IvD***

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 21:
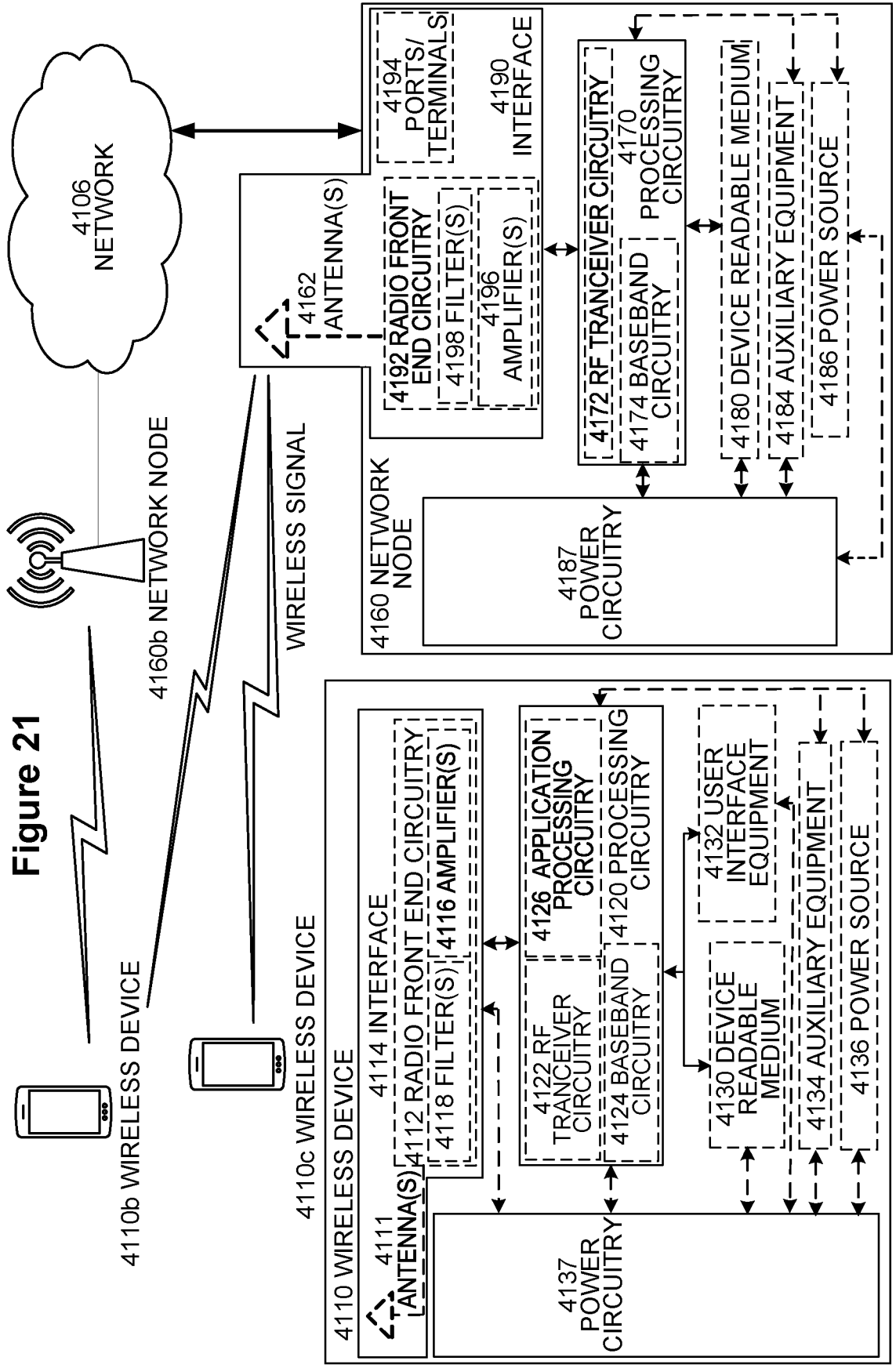
FIG. 21 is a block diagram of a wireless network in accordance with some embodiments.

FIG. 21 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 21 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 22:
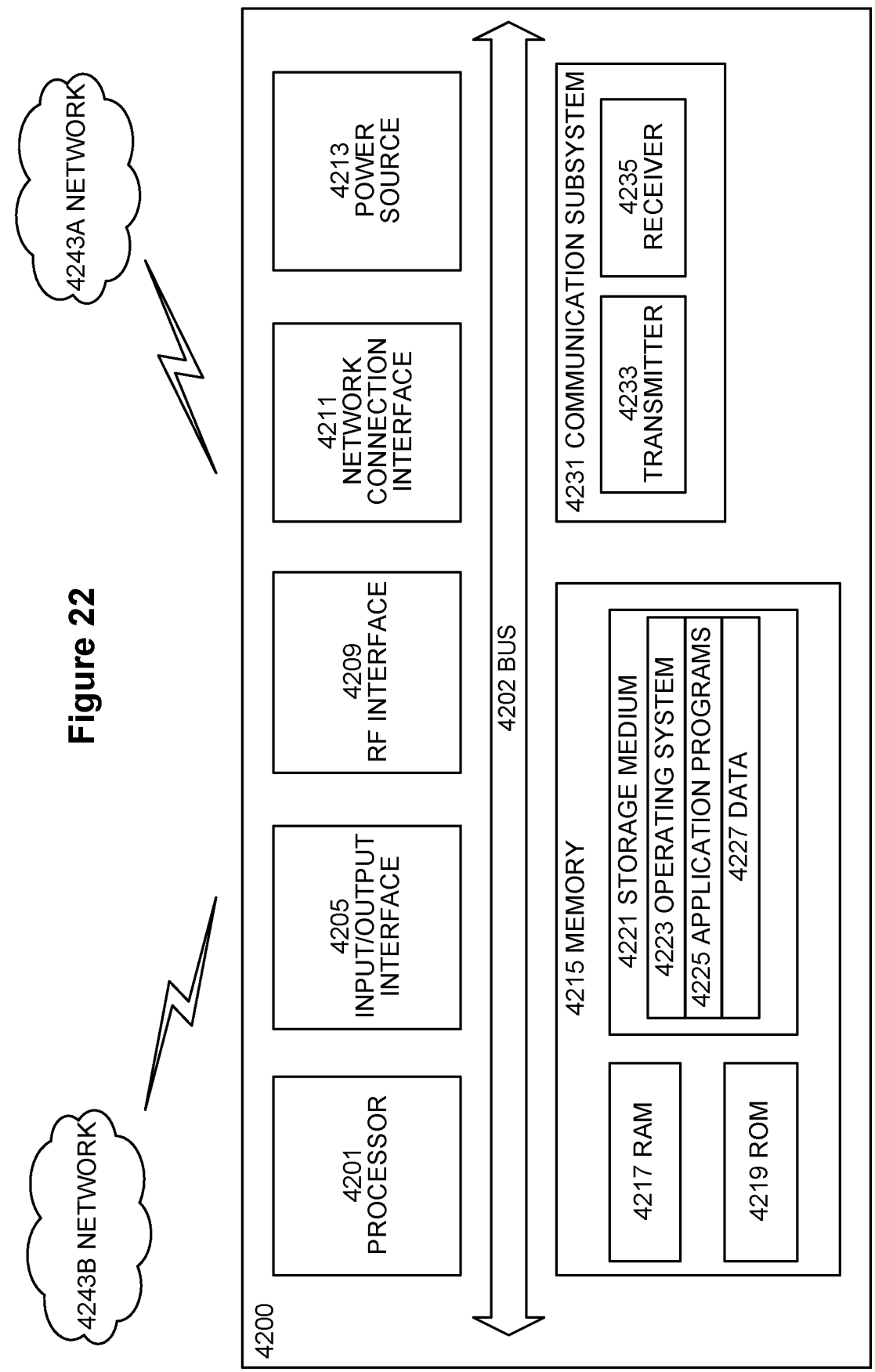
FIG. 22 is a block diagram of a user equipment in accordance with some embodiments

FIG. 22 illustrates a user Equipment in accordance with some embodiments.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 22, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 23:
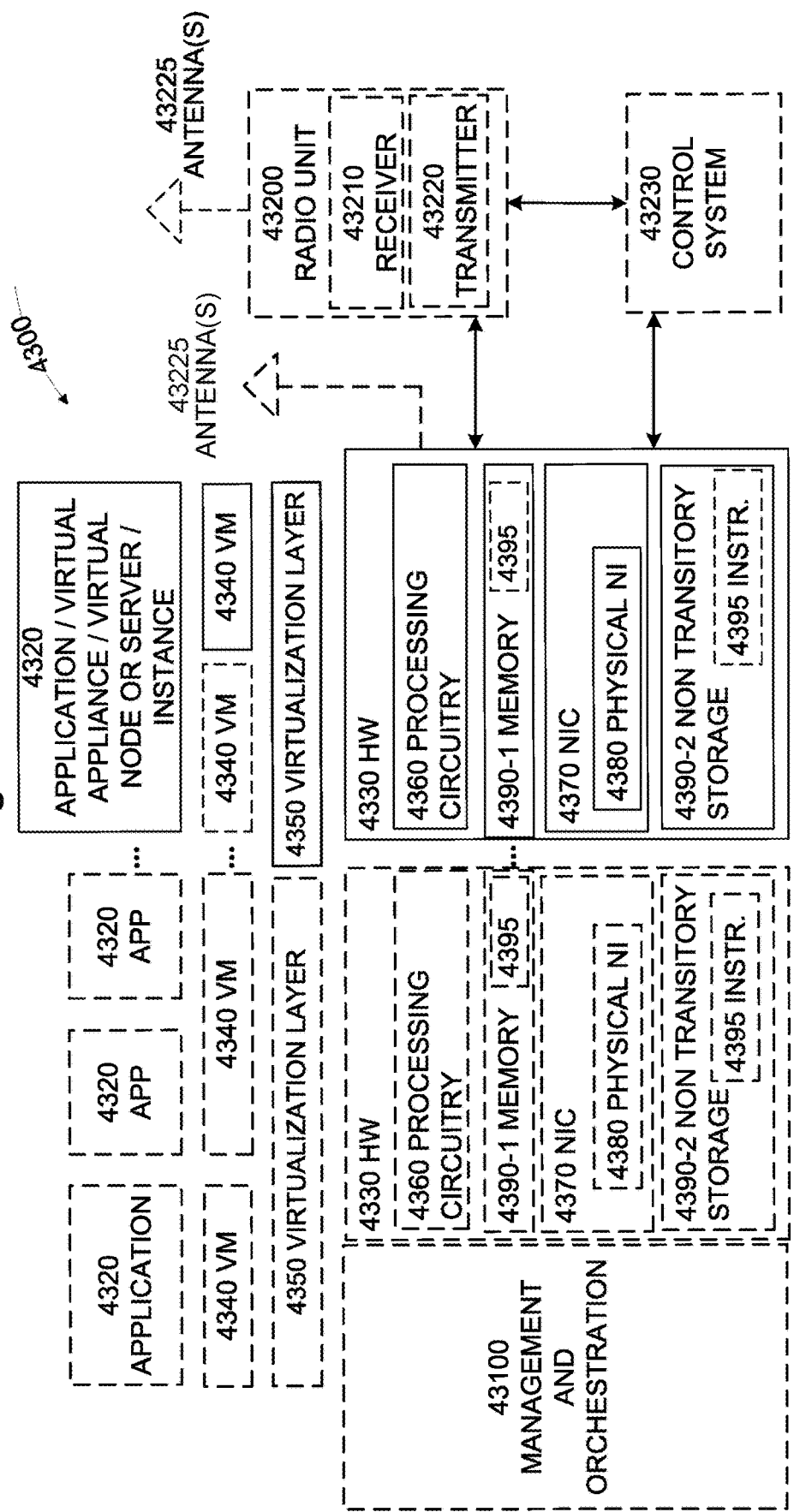
FIG. 23 is a block diagram of a virtualization environment in accordance with some embodiments.

FIG. 23 illustrates a virtualization environment in accordance with some embodiments.

FIG. 23 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 23, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 23.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 24:
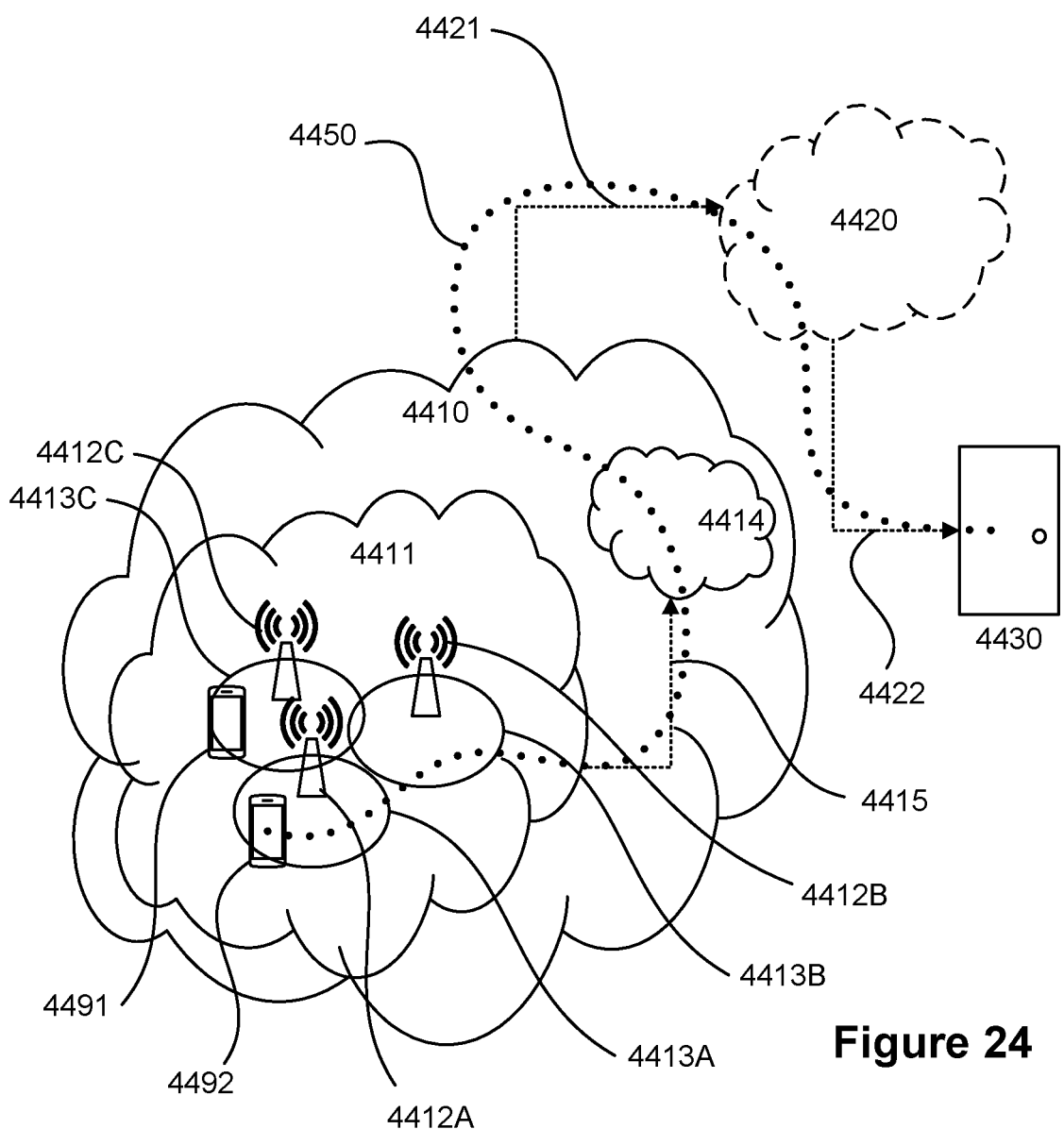
FIG. 24 is a block diagram of a telecommunication network connected via an intermediate network to a host computer in accordance with some embodiments.

FIG. 24 illustrates a telecommunication network connected via an intermediate network to a host computer in accordance with some embodiments.

With reference to FIG. 24, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 24 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 25:
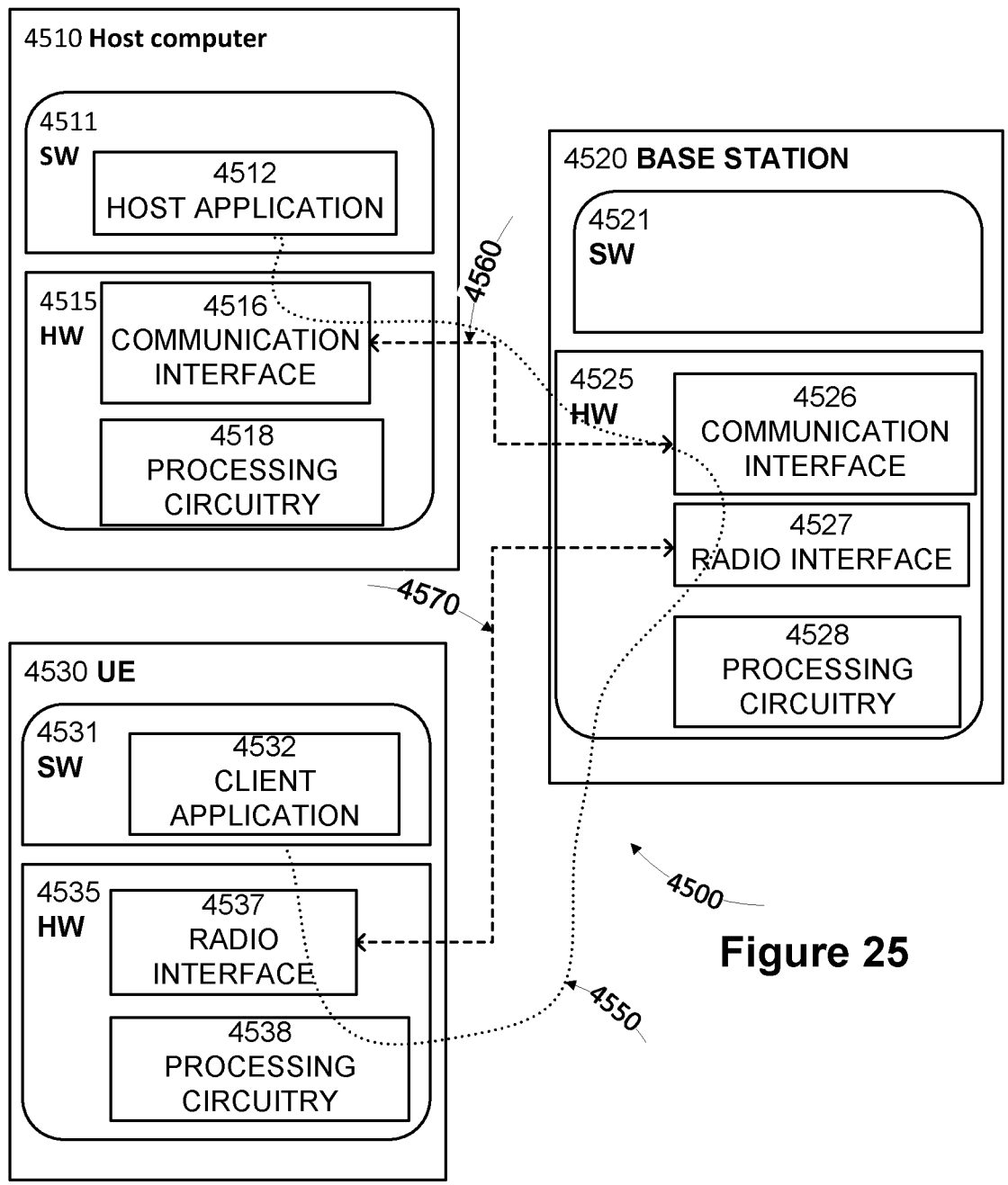
FIG. 25 is a block diagram of a host computer communicating via a base station with a user equipment over a partially wireless connection in accordance with some embodiments.

FIG. 25 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 25. In communication system 41600, host computer 4510 comprises hardware 4515 including communication interface 4516 configured to set up and maintain a wired or wireless connection with an interface of a different communication device of communication system 41600. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 41600 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 41600, as well as radio interface 4527 for setting up and maintaining at least wireless connection 4570 with UE 4530 located in a coverage area (not shown in FIG. 25) served by base station 4520. Communication interface 4526 may be configured to facilitate connection 4560 to host computer 4510. Connection 4560 may be direct or it may pass through a core network (not shown in FIG. 25) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 41600 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 25 may be similar or identical to host computer 4430, one of base stations 4412a, 4412b, 4412c and one of UEs 4491, 4492 of FIG. 24, respectively. This is to say, the inner workings of these entities may be as shown in FIG. 25 and independently, the surrounding network topology may be that of FIG. 24.

In FIG. 25, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 26:
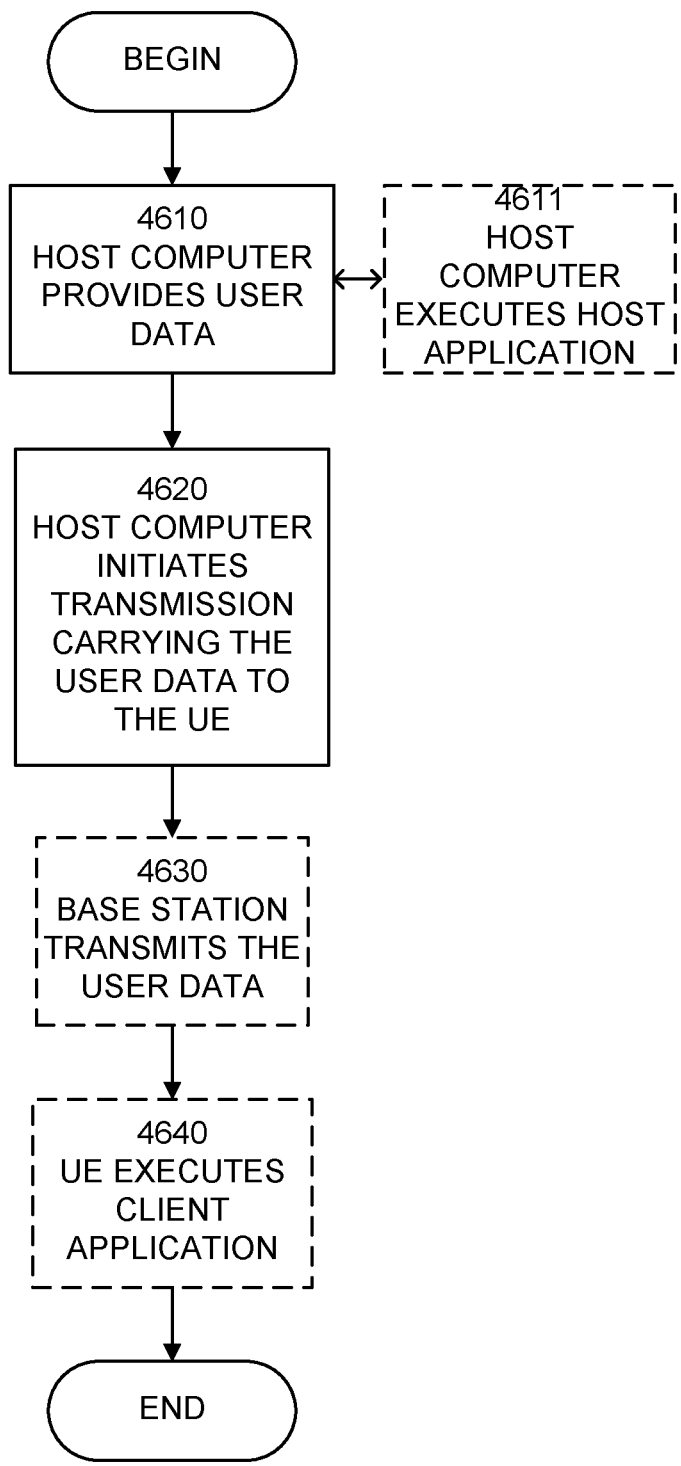
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 27:
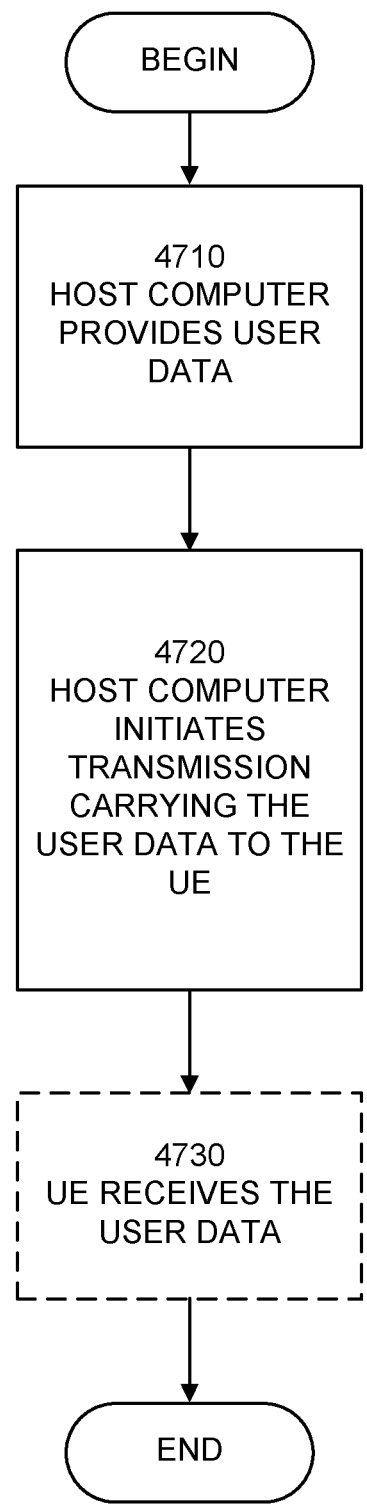
FIG. 27 is a block diagram of methods implemented in a communication system including a host computer, a base station and a user equipment in accordance with some embodiments.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O & M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a wireless terminal operating in Multi-Radio Dual Connectivity ("MR-DC") and configured with a first cell group associated with a first network node and a second cell group associated with a second network node, the method comprising:
    monitoring conditions and events for an indication that an operating mode of the second cell group should be modified;
    responsive to detecting the indication that the operating mode of the second cell group should be modified, transmitting an indication to a network requesting a modification for the operating mode of the second cell group;
    receiving a command from the network to change the operating mode of the second cell group; and
    responsive to receiving the command, adjusting the operating mode of the second cell group based on the command.

2. The method of claim 1, wherein the first cell group is a Master Cell Group ("MCG") comprising a primary cell ("PCell") and MCG secondary cells ("SCells") associated with a Master Node ("MN") and the second cell group is a Secondary Cell Group ("SCG") comprising a primary secondary cell ("PSCell") and SCG SCells associated with a Secondary Node ("SN").

3. The method of claim 1, wherein the first cell group is a Secondary Cell Group ("SCG") comprising a primary secondary cell ("PSCell") and SCG secondary cells ("SCells") associated with a Secondary Node ("SN") and the second cell group is a Master Cell Group ("MCG") comprising a primary cell ("PCell") and MCG SCells associated with a Master Node("MN").

4. The method of claim 1, wherein the operating mode of the second cell group comprises one of a normal operating mode or a reduced/power-saving mode.

5. The method of claim 1, wherein the conditions and the events that are monitored comprise at least one of:

uplink ("UL") buffer status of radio bearers;
detection of incoming UL data;
UL/downlink ("DL") throughput;
mobility state;
information related to temperature including overheating conditions;
power/battery level;
expiry of a timer that is started when the wireless terminal receives a command to enter the operating mode, and the timer is stopped when the wireless terminal receives a command to leave the operating mode;
an indication associated to data bulk consumption; and
an indication of a specified type of movement.

6. The method of claim 5, wherein the UL buffer status of radio bearers comprises a total UL buffer status of all radio bearers or UL buffer status of a subset of radio bearers,
wherein the subset of radio bearers is determined based on at least one of:
a packet data convergence protocol ("PDCP") termination point of radio bearers whose PDCP is terminated at the second network node;
a Cell group association comprising at least one of:
radio bearers that are associated with only the second cell group; and
radio bearers that are associated with both the first and second cell group;
a Service/Application type or quality of service ("QoS") profile comprising at least one of radio bearers that have a specific QoS profile; and
an explicit list of radio bearer identities provided by the network.

7. The method of claim 5, wherein the detection of incoming UL data comprises at least one of:
arrival of UL data for a radio bearer that is suspended;
arrival of UL data for a radio bearer whose packet data convergence protocol ("PDCP") is terminated at the second network node;
arrival of UL data for a radio bearer that is associated with only the second cell group, while the second cell group is suspended;
arrival of UL data for a radio bearer that is associated with both the first cell group and the second cell group, where a primary path for the radio bearer is the second cell group and the second cell group is suspended; and
arrival of UL data for radio bearers with a certain specific service or QoS profile which is expected to be better served by the second cell group.

8. The method of claim 5, wherein the UL/DL throughput comprises one of a total UL/DL throughput of all radio bearers or the UL/DL throughput of a subset of radio bearers, and
wherein the subset of the radio bearers is determined based on at least one of:
a PDCP termination point;
a cell group association comprising one of:
radio bearers that are associated with only the second cell group; or
radio bearers that are associated with both the first cell group and the second cell group;
a service/application type or quality of service ("QoS") profile of radio bearers that have a specific QoS profile; and
an explicit list of radio bearer Identities provided by the network.

9. The method of claim 6, wherein monitoring the conditions and events comprises determining that the UL buffer status remains below a first threshold for a specific filtering duration.

10. The method according to of claim 6, wherein monitoring the conditions and events comprises determining that the UL buffer status stays above a second threshold for a specific filtering duration.

11. The method of claim 9, where transmitting the indication comprises transmitting an indication to put the second cell group in a reduced/power-saving mode.

12. The method of claim 9, wherein each radio bearer whose buffer levels are being monitored has associated threshold values.

13. The method of claim 9, wherein a value of the first threshold and the second threshold are the same for at least a subset of the radio bearers whose buffer levels are being monitored.

14. The method of claim 10, wherein transmitting the indication comprises transmitting an indication to put the second cell group in a normal operating mode.

15. The method of claim 8, wherein the conditions related to UL/DL throughput of radio bearers is considered to be fulfilled when the UL/DL throughput remains below a first threshold for a specific duration.

16. The method of claim 15, wherein transmitting the indication comprises transmitting an indication to put the second cell group in a reduced/power-saving mode.

17. The method of claim 15, wherein the conditions related to UL/DL throughput of radio bearers is considered to be fulfilled when the UL/DL throughput stays above a second threshold for a specific duration.

18. The method of claim 15, wherein each radio bearer whose throughput levels are being monitored has an associated value of the first threshold and the second threshold.

19. The method of claim 15, wherein values of the first threshold and the second threshold are the same for at least a subset of the radio bearers whose throughput levels are being monitored.

20. The method of claim 16, wherein transmitting the indication comprises transmitting an indication to put the second cell group in a normal operating mode.

* * * * *